(12) United States Patent
Ogawa

(10) Patent No.: US 9,319,623 B2
(45) Date of Patent: Apr. 19, 2016

(54) IMFORMATION PROCESSING APPARATUS AND INFORMATION PROCESSING SYSTEM

(71) Applicant: Minami Ogawa, Tokyo (JP)

(72) Inventor: Minami Ogawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/329,045

(22) Filed: Jul. 11, 2014

(65) Prior Publication Data
US 2015/0036056 A1 Feb. 5, 2015

(30) Foreign Application Priority Data

Aug. 5, 2013 (JP) ................. 2013-162295

(51) Int. Cl.
| | |
|---|---|
| H04L 29/06 | (2006.01) |
| H04N 5/74 | (2006.01) |
| G06F 15/167 | (2006.01) |
| G06F 3/14 | (2006.01) |
| H04N 21/41 | (2011.01) |
| H04N 21/258 | (2011.01) |
| H04N 21/262 | (2011.01) |
| H04N 21/475 | (2011.01) |
| H04N 21/482 | (2011.01) |
| H04N 21/61 | (2011.01) |
| G06F 21/00 | (2013.01) |
| G06F 7/04 | (2006.01) |
| G06F 17/30 | (2006.01) |
| H04N 7/16 | (2011.01) |

(52) U.S. Cl.
CPC .. *H04N 5/74* (2013.01); *G06F 3/14* (2013.01); *G06F 15/167* (2013.01); *H04N 21/25875* (2013.01); *H04N 21/26258* (2013.01); *H04N 21/4122* (2013.01); *H04N 21/4753* (2013.01); *H04N 21/4825* (2013.01); *H04N 21/6125* (2013.01)

(58) Field of Classification Search
None
See application file for complete search history.

(56) References Cited

U.S. PATENT DOCUMENTS

| | | | | |
|---|---|---|---|---|
| 6,735,616 | B1 * | 5/2004 | Thompson et al. | 709/204 |
| 7,313,589 | B2 * | 12/2007 | Tran et al. | 709/203 |
| 2002/0122158 | A1 * | 9/2002 | Miyashita et al. | 353/30 |
| 2004/0267981 | A1 * | 12/2004 | Kakemura | 710/48 |
| 2006/0061580 | A1 * | 3/2006 | Fujiwara et al. | 345/530 |
| 2008/0234843 | A1 * | 9/2008 | Akaiwa et al. | 700/83 |
| 2013/0047190 | A1 * | 2/2013 | Suzuki et al. | 725/86 |
| 2013/0110768 | A1 * | 5/2013 | Sakamoto | 707/609 |

(Continued)

FOREIGN PATENT DOCUMENTS

| | | |
|---|---|---|
| JP | 2005-141602 | 6/2005 |
| JP | 2012-141977 | 7/2012 |
| JP | 2013-186538 | 9/2013 |

*Primary Examiner* — Shin-Hon Chen
(74) *Attorney, Agent, or Firm* — Harness, Dickey & Pierce, P.L.C.

(57) ABSTRACT

An information processing apparatus stores sets of image data associated with sets of user identification information. When receiving a set of the user identification information and a set of apparatus identification information identifying one of image display apparatuses, the information processing apparatus stores information of a stored set of image data associated with the received set of user information in a manner of associating the stored set of image data with the received set of apparatus identification information, and, in response to receiving a request from the image display apparatus identified by the set of apparatus identification information, transmits the set of image data associated with the set of apparatus identification information to the image display apparatus.

11 Claims, 30 Drawing Sheets

(56) References Cited

U.S. PATENT DOCUMENTS

| | | | |
|---|---|---|---|
| 2013/0238689 A1* | 9/2013 | Matsushima et al. | 709/203 |
| 2014/0020117 A1* | 1/2014 | Nagai et al. | 726/29 |
| 2014/0118619 A1* | 5/2014 | Hagiwara et al. | 348/554 |

* cited by examiner

FIG.6

| USER INFORMATION ||  |
|---|---|---|
| USER ID || abc |
| PASSWORD || xxx |
| ACCESS NUMBER || 12345 |
| AVAILABLE SERVICE | local | ○ |
|  | ext1 | ○ |
|  | ext2 | × |

FIG.7

```
[
  {
    "type": "directory",
    "name": "local"
  },
  {
    "type": "directory",
    "name": "ext1"
  }
]
```

FIG.8

| FILE INFORMATION | |
|---|---|
| FILE NAME | presentation.ppt |
| USER ID | abc |
| REGISTRATION DATE AND TIME | 2013-01-01 10:00 |
| APPARATUS ID OF APPARATUS THAT PROJECTS IMAGE | PJ0001 |
| ASSOCIATING DATE AND TIME | 2013-02-07 15:00 |
| FILE PATH | /data/abc/presentation/ |

FIG.12A

PROJECTION SERVER PORTAL

USER ID : abc   CHANGE SETTING   LOGOUT

---

INTERNAL STORAGE SERVICE

FILE UPLOAD

[        ] [REFER TO]  SELECT FILE

⦿ PROJECT ONLY ONCE   ○ PROJECT FOR LIMITED TIME

[UPLOAD]

FILE MANAGEMENT

TO FILE MANAGEMENT SCREEN PAGE

FIG.12B

| USER ID | abc |
|---|---|
| PASSWORD | *** |
| PASSWORD (CONFIRMATION) | *** |

ACCESS NUMBER   12345   [CHANGE]

AVAILABLE SERVICE

☑ local   ☑ ext1   ☐ ext2

[STORE]

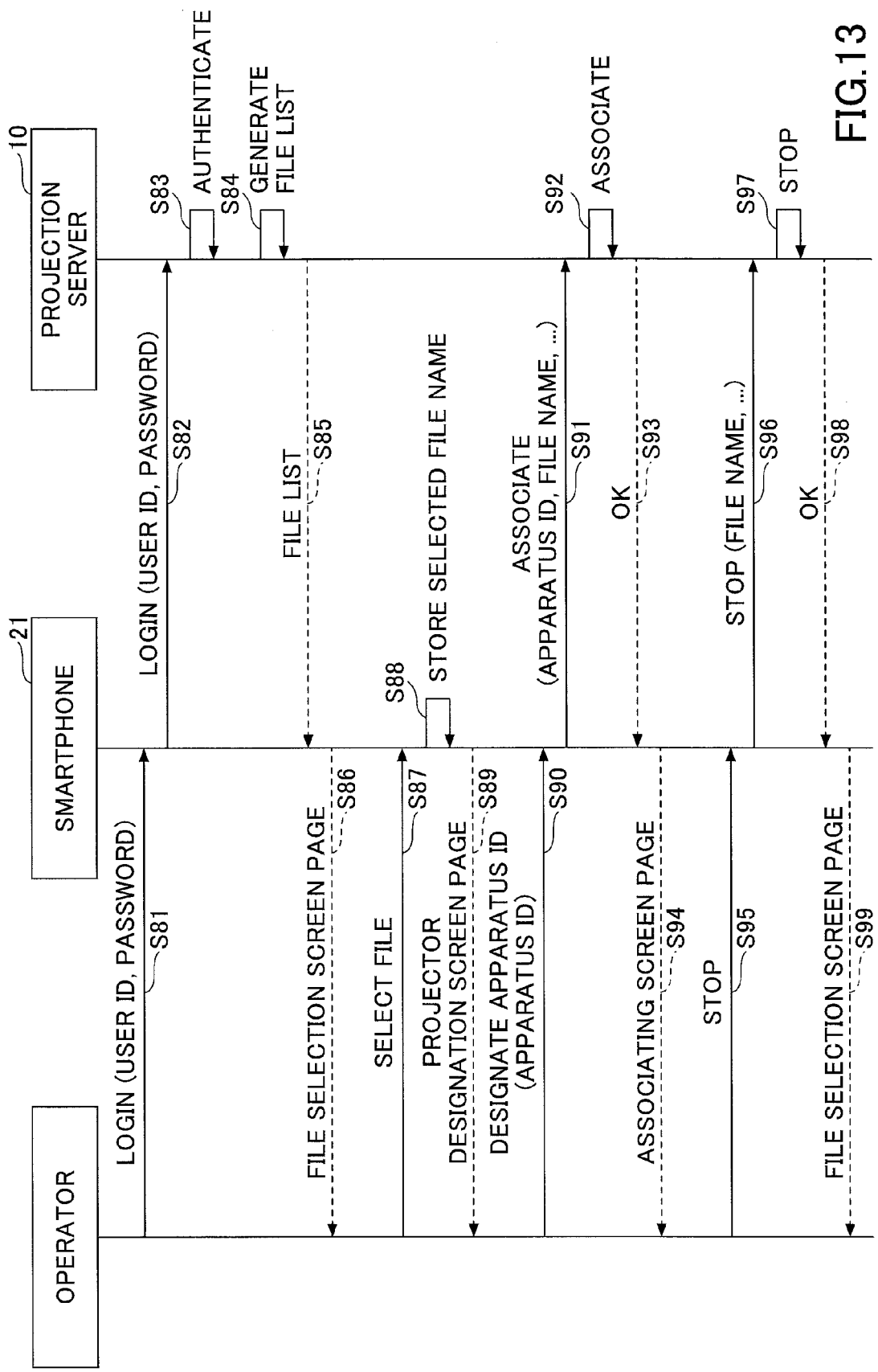

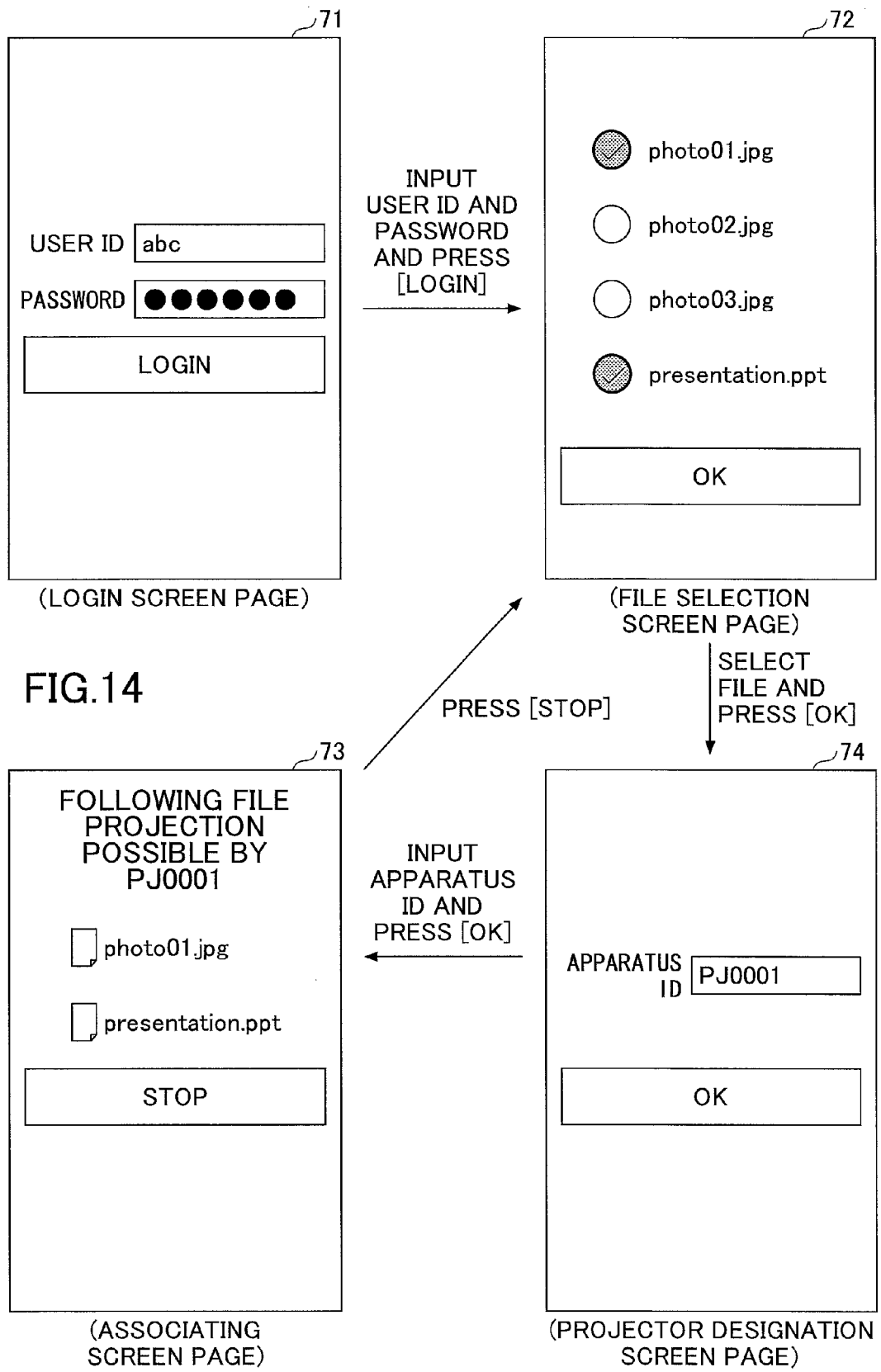

FIG.17

| USER INFORMATION | | | |
|---|---|---|---|
| USER ID | | | abc |
| PASSWORD | | | xxx |
| AVAILABLE SERVICE | | local | ○ |
| | | ext1 | ○ |
| | | ext2 | × |
| APPARATUS USED FOR PROJECTION | | APPARATUS ID | PJ0001 |
| | | COMMENT | LIVING ROOM |
| | | APPARATUS ID | PJ0002 |
| | | COMMENT | CONFERENCE ROOM #1 |
| | | APPARATUS ID | PJ0003 |
| | | COMMENT | CONFERENCE ROOM #2 |

| APPARATUS INFORMATION | |
|---|---|
| APPARATUS ID | PJ0001 |
| ALLOW OTHER USER TO PROJECT | × |

| APPARATUS AUTHENTICATION INFORMATION ||
|---|---|
| APPARATUS ID | PJ0001 |
| KEY | S4r3XRazkBF92vV2 |

IMFORMATION PROCESSING APPARATUS AND INFORMATION PROCESSING SYSTEM

BACKGROUND OF THE INVENTION

1. Field of the Invention

The present invention relates to an information processing apparatus and an information processing system.

2. Description of the Related Art

In the related art, a projector gains popularity as a tool for presentation of content to customers. To a projector, content to be displayed is input. A user directly connects a portable computer storing content with the projector and inputs the content to the projector. Further, in a conference room, a user prepares a special computer, linked with the projector, for the purpose of accessing the user's content, and the user inputs the content to the projector (for example, see Japanese Laid-Open Patent Application No. 2012-141977 (Patent Reference No. 1)).

SUMMARY OF THE INVENTION

According to one aspect of the present invention, an information processing apparatus includes a network interface configured to connect the information processing apparatus with a plurality of image display apparatuses each displaying an image; one or more memories configured to store one or more sets of image data in a manner of associating the one or more sets of image data with respective sets of user identification information identifying respective users; and one or more sets of circuitry configured to, in response to receiving from an operation terminal a set of the user identification information identifying a user and a set of apparatus identification information identifying one of the image display apparatuses, store information of a set of image data that is associated with the received set of user information from among the one or more sets of image data stored in the one or more memories in a manner of associating the set of image data with the received set of apparatus identification information, and in response to receiving a request frosts the one of the image display apparatuses identified by the set of apparatus identification information, transmit the set of image data associated with the set of apparatus identification information from among the one or more sets of image data stored in the one or more memories to the one of the image display apparatuses.

According to another aspect of the present invention, an information processing apparatus includes a network interface configured to connect the information processing apparatus with a plurality of image display apparatuses each displaying an image; one or more memories configured to store one or more sets of image data in a manner of associating the one or more sets of image data with respective sets of user identification information identifying respective users; and one or more sets of circuitry configured to, in response to receiving from an operation terminal a set of the user identification information identifying a user, transmit respective sets of image data identification information identifying sets of image data associated with the received set of user information from among the one or more sets of image data stored in the one or more memories, in response to receiving, from the operation terminal, a set of the image data selected based on the respective sets of image data identification information and a set of apparatus identification information identifying one of the image display apparatuses, store information of the set of image data concerning the selected set of image data from among the one or more sets of image data stored in the one or more memories in a manner of associating the set of image data with the received set of apparatus identification information, and in response to receiving a request from the one of the image display apparatuses identified by the set of apparatus identification information, transmit the set of image data associated with the set of apparatus identification information from among the one or more sets of image data stored in the one or more memories to the one of the image display apparatuses.

Other objects, features and advantages of the present invention will become more apparent from the following detailed description when read in conjunction with the accompanying drawings.

BRIEF DESCRIPTION OF THE DRAWINGS

FIG. 6 is a configuration diagram of one example of user information;

FIG. 7 is a configuration diagram of one example of a root index file;

FIG. 8 is a configuration diagram of one example of file information;

FIGS. 12A and 12B are image diagrams of one example of portal screen pages after login;

FIG. 13 is a sequence diagram of one example of an associating process;

FIG. 14 is a screen page transition diagram at a time of the associating process;

FIG. 17 is a configuration diagram of user information in another example;

DETAILED DESCRIPTION OF THE EMBODIMENT

Below, using the drawings, the embodiment of the present invention will be described in detail.

First, a problem to be solved by the embodiment of the present invention will be described.

In some cases, when an image display apparatus such as a projector displays an image, a user previously designates the image to be displayed from among a plurality of images. However, if an operation part of the image display apparatus is not one which is easy to operate, operations required to designate an image by using the operation part may be troublesome for the user.

An object of the embodiment of the present invention is to provide an information processing apparatus and an information processing system by which it is possible to improve convenience of such an image display apparatus.

Below, the embodiment of the present invention will be described in detail.

<System Configuration>

Figure 1:
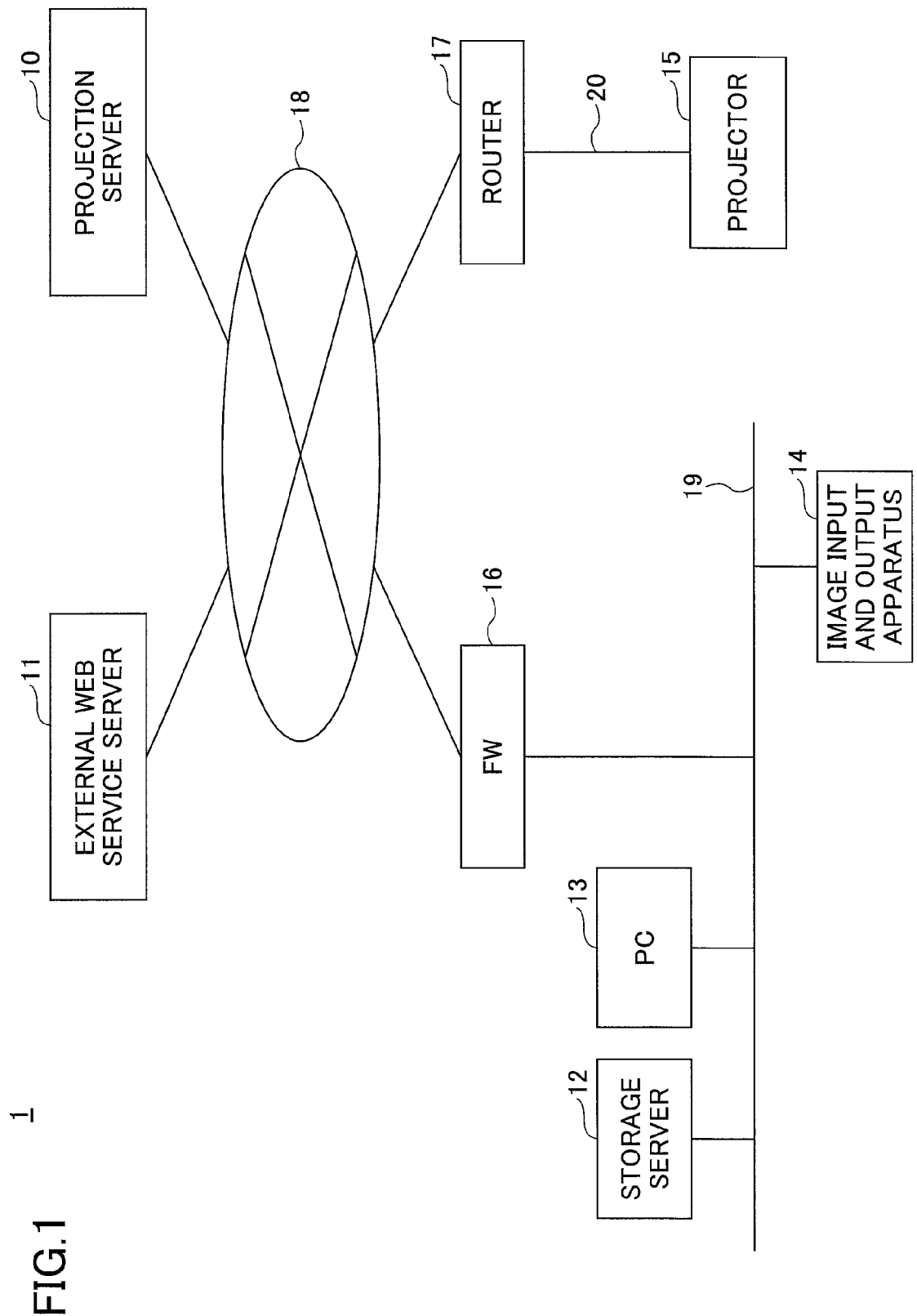
FIG. 1 is a configuration diagram of one example of a projection system.

FIG. 1 is a configuration diagram of one example of a projection system. The projection system 1 shown in FIG. 1 includes a projection server 10, an external Web service server 11, a storage server 12, a PC 13, an image input and output apparatus 14, a projector 15, a firewall (FW) 16, a router 17 and networks 18, 19 and 20.

The projection server 10 and the external Web service server 11 are connected together by the network 18 such as the Internet. For example, functions of the projection server 10 and the external Web service server 11 can be provided by Web services such as cloud services which are typical examples.

The external Web service server 11 is one example of an apparatus providing a Web service. The external Web service server 11 provides Web services such as a storage service, an application service and so forth. The external Web service server 11 provides content to the projection server 10.

Also the network 19 such as a LAN is connected with the network 18 via the FW 16. The storage server 12, the PC 13 and the image input and output apparatus 14 are connected to the network 19.

The storage server 12, the PC 13 and the image input and output apparatus 14 are examples of apparatuses providing Web services. By using the Web services, the storage server 12, the PC 13 and the image input and output apparatus 14 provide (upload) content to the projection server 10.

Further, the storage server 12, the PC 13 and the image input and output apparatus 14 are examples of apparatuses providing content to the projection server 10 by using an uploading process (described later). The image input and output apparatus 14 is, for example, a multifunction peripheral, a scanner, a digital camera or the like.

Also the network 20 such as a LAN is connected with the network 18 via the router 17. The projector 15 is connected to the network 20. The projector 15 has a client function installed therein for cooperating with the projection server 10. By using the client function, the projector 15 acquires content from the projection server 10 as will be described later and projects it. Note that, the networks 19 and 20 can be those of a wired communication type or a wireless communication type or those including both a wired communication part and a wireless communication part.

The projector 15 according to the embodiment is one example of an image display apparatus. The projection system is one example of an image display system or an information processing system. Projection of an image carried out by the projector 15 is one example of display of an image by an image display apparatus. The external Web service server 11, the storage server 12, the PC 13 and the image input and output apparatus 14 are examples of apparatuses providing (uploading) content.

<Hardware Configuration>

Figure 2:
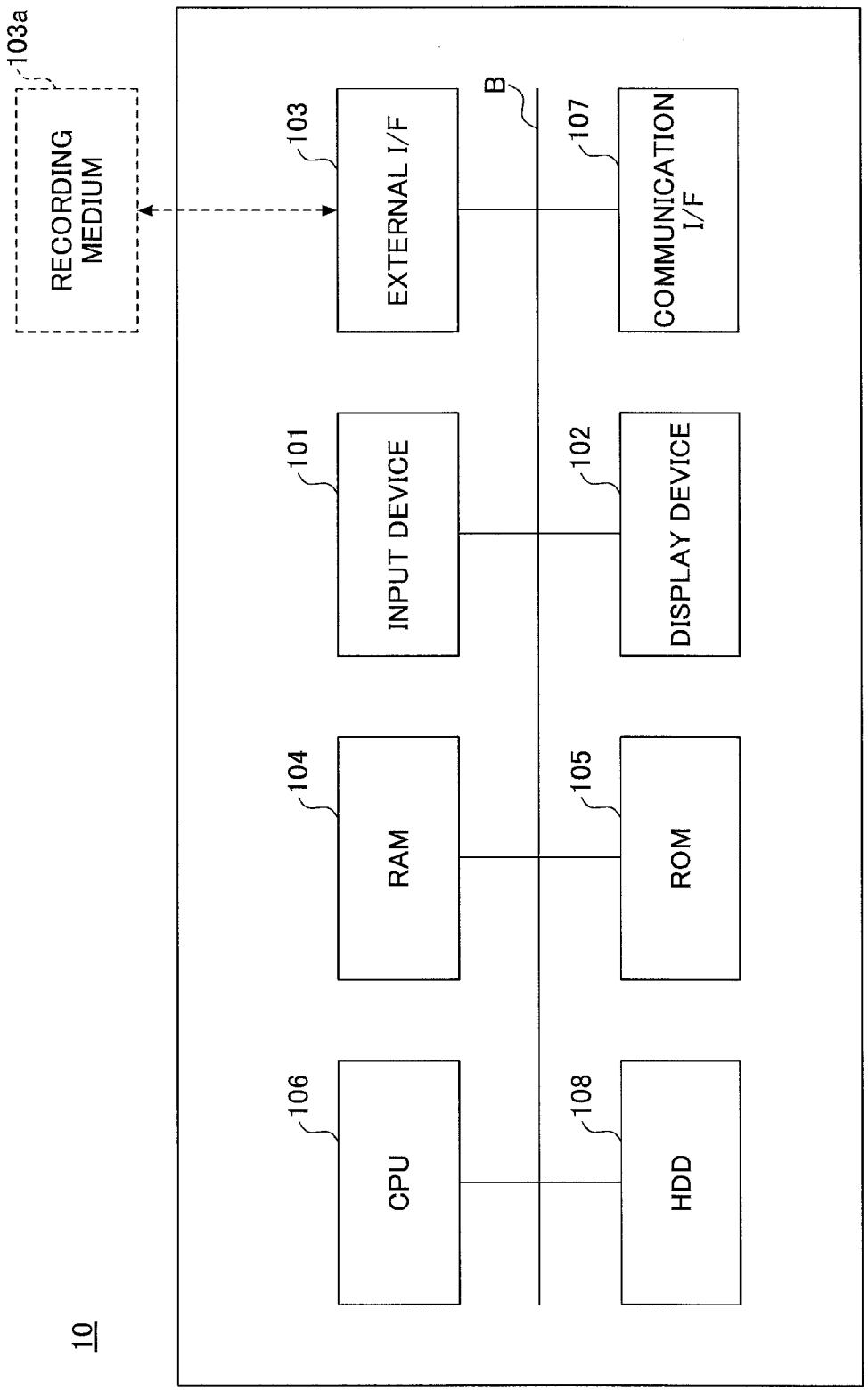
FIG. 2 is a hardware configuration diagram of one example of a projection server.

FIG. 2 is a hardware configuration diagram of one example of the projection server 10. The projection server 10 shown in FIG. 2 includes an input device 101, a display device 102, an external I/F 103, a RAM 104, a ROM 105, a CPU 106, a communication I/F 107 and a HDD 108 which are connected via a bus B.

The input device 101 includes a keyboard and a mouse, and is used to input various operation signals to the projection server 10. The display device 102 displays a process result of the projection server 10 and so forth.

The communication I/F 107 is an interface for connecting the projection server 10 with the network 18. Thereby, the projection server 10 can carry out data communication with the external Web service server 11, the storage server 12, the PC 13, the image input and output apparatus 14 and the projector 15 via the communication I/F 107.

The HDD 108 is a nonvolatile storage device storing programs and data. The stored programs and data include an OS as basic software controlling the entirety of the projection server 10 and application software providing various functions under the control of the OS. Further, the HDD 108 manages the stored programs and data by using a predetermined file system(s) and/or DB(s).

The external I/F 103 is an interface for communication with external devices. The external devices include a recording medium 103a, for example. Thereby, the projection server 10 can read information from and write information into the recording medium 103a, for example, via the external I/F 103. The recording medium 103a can be a flexible disk, a CD, a DVD, a SD memory card, a USB memory or the like.

The ROM 105 is a nonvolatile semiconductor memory (storage device) being able to store programs and data even after the power supply is turned off. In the ROM 105, various programs and data are stored such as a BIOS executed when the projection server 10 is started, OS settings, network settings and so forth. The RAM 104 is a volatile semiconductor memory (storage device) storing programs and data temporarily.

The CPU 106 includes an arithmetic and logic unit for implementing control of the entirety of the projection server 10 and various functions by reading programs and data from the ROM 105, the HDD 108 and/or the like onto the RAM 104 and carrying out processes.

The projection server 10 can implement various functions which will be described later by the above-mentioned hardware configuration. Note that the projection server 10 can also be implemented by, instead of the hardware shown in FIG. 2, a virtual machine operating in an Infrastructure as a service (Iaas) which has recently become wide spread.

<Software Configuration>

Figure 3:
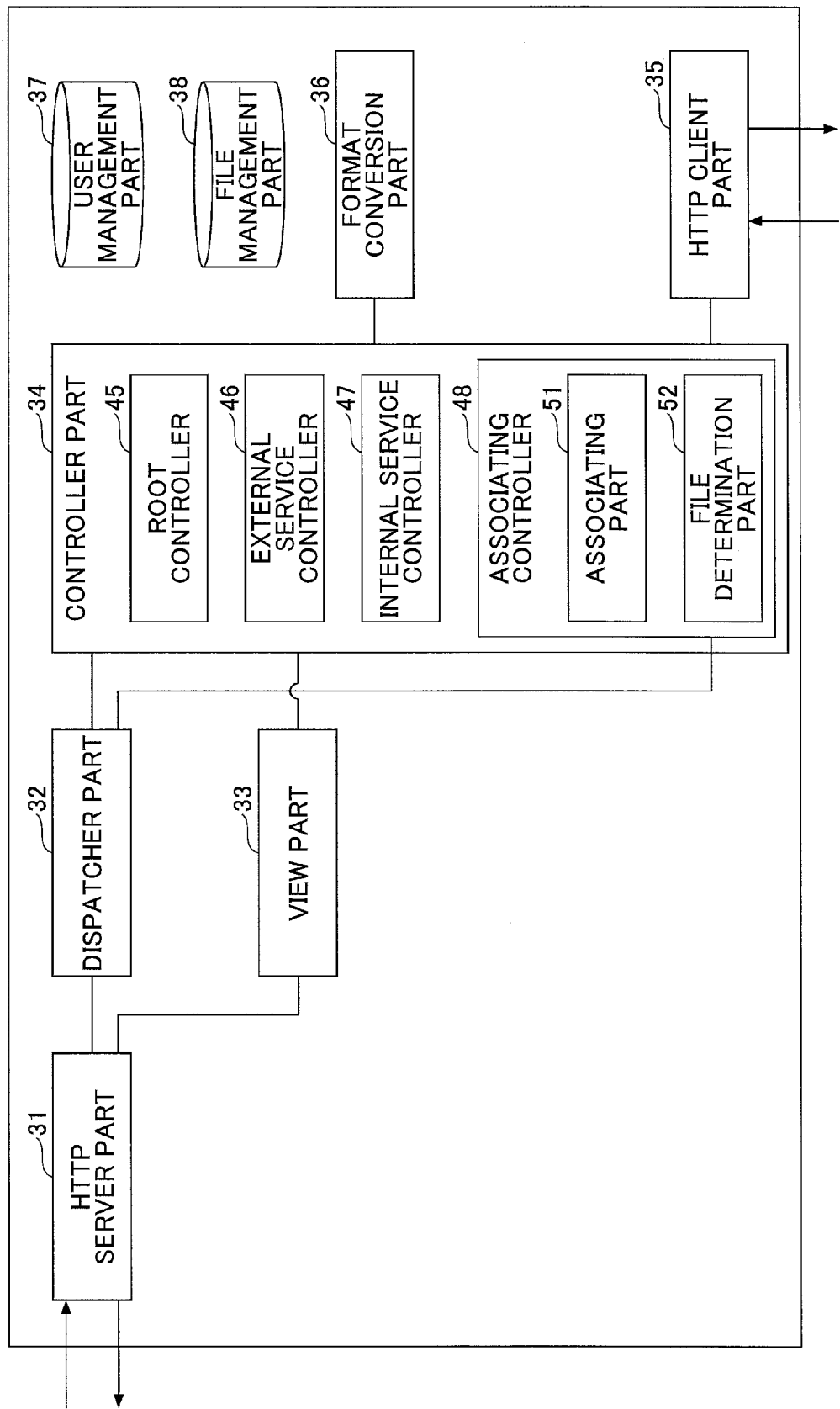
FIG. 3 is a software configuration diagram of one example of the projection server.

FIG. 3 is a software configuration diagram of one example of the projection server 10. The projection server 10 implements an HTTP server part 31, a dispatcher part 32, a view part 33, a controller part 34, an HTTP client part 35, a format conversion part 36, a user management part 37 and a file management part 38 by executing the program(s).

The HTTP server part 31 carries out HTTP(S) communication with the projector 15 and browsers (not shown). Note that the browsers are installed in, for example, the PC 13 operated by an operator, a PC for uploading content to the projection server 10, described later, and so forth. Further, the HTTP client part 35 carries out HTTP(S) communication with the external Web service server 11, the storage server 12, the PC 13, the image input and output apparatus 14 and so forth.

Below, a term "external service" will be used to mean both a Web service with which the external Web service server 11 provides content to the projection server 10 and a Web service with which the storage server 12, the PC 13 and the image input and output apparatus 14 provide (upload) content to the projection server 10.

The user management part 37 manages user information, authentication information for external services and so forth. The file management part 38 manages a file uploaded to an internal service, a file converted as described later, a temporary file downloaded from the external Web service server 11, the storage server 12, the PC 13 or the image input and output apparatus 14, and so forth. Note that files managed by the file management part 38 include an "index file" and a "content file" described later.

An "index file" is an example of index information. An index file is a file including information concerning content files that can be provided to the projector 15 and includes information of a list of the content files. In more detail, an index file includes information of content files and subdirectories that can be provided to the projector 15, as will be described later. Further, a "content file" is one example of image data. A content file is a still image file, a moving image file or the like.

The HTTP server part 31 receives HTTP requests from HTTP client parts (not shown) of the projector 15 and the browsers (not shown), The HTTP server part 31 interprets the received HTTP requests and transmits necessary information (URLs) to the dispatcher part 32. The dispatcher part 32 distributes the received URLs to the controller part 34 as will be described later.

The controller part 34 includes a root controller 45, an external service controller 46, an internal service controller 47 and an associating controller 48. The associating controller 48 includes an associating part 51 and a file determination part 52. Note that the external service controller 46 and the internal service controller 47 included in the controller part 34 are different depending on internal services and external services to be used. For example, the controller part 34 can include the external service controller 46 for each of external services to be used, or include the external service controller 46 for each type of external services.

The controller part 34 carries out a process of acquiring an index file, a process of acquiring a content file and so forth according to URLs distributed by the dispatcher part 32 as will be described. Further, as it is necessary, the controller part 34 causes the format conversion part 36 to convert the format of an index file or a content file into one able to be projected by the projector 15. The controller part 34 transmits an index file and/or a content file, to be transmitted to the HTTP client part of the projector 15, to the HTTP server part 31.

The controller part 34 stores a content file, uploaded from the HTTP client part of the browser, in a storage (internal storage) of the projection server 10.

The controller part 34 transmits information, to be displayed by the HTTP client part of the browser, to the view part 33. The view part 33 generates a HTML file and transmits it to the HTTP server part 31. The HTTP server part 31 transmits an HTML file, an index file or a content file to the HTTP client part of the projector 15 or the browser as a HTTP response.

The root controller 45 generates a root index file having a list of directories of internal services and/or external services available for an operator based on "available service" included in "user information" described later. The root index file generated by the root controller 45 is transmitted to the projector 15. The projector 15 displays a file list screen page based on the root index file. Note that in a file list screen page, information concerning directories or files included in an index file is displayed.

The external service controller 46 receives a URL from the dispatcher part 32 and receives, for example, an index file or content files of an external service from the external Web service server 11 based on the received URL. The index file or the content files of the external service is/are transmitted to the projector 15. The projector 15 displays a file list screen page based on the index file of the external service.

The internal service controller 47 receives a URL from the dispatcher part 32 and acquires, for example, an index file or content files of an internal service (internal storage) from the file management part 38 based on the received URL. The index file or the content files of the internal service is/are transmitted to the projector 15. The projector 15 displays a file list screen page based on the index file of the internal service.

The associating controller 48 associates content files with the projector 15 as will be described so that the content files can be projected by the associated projector 15. The associating part 51 carries out a process of associating content files with the projector 15. The file determination part 52 carries out a process of determining content files.

<Flow of Process>

<<Process between Projection Server 10 and Projector 15>>

Figure 4:
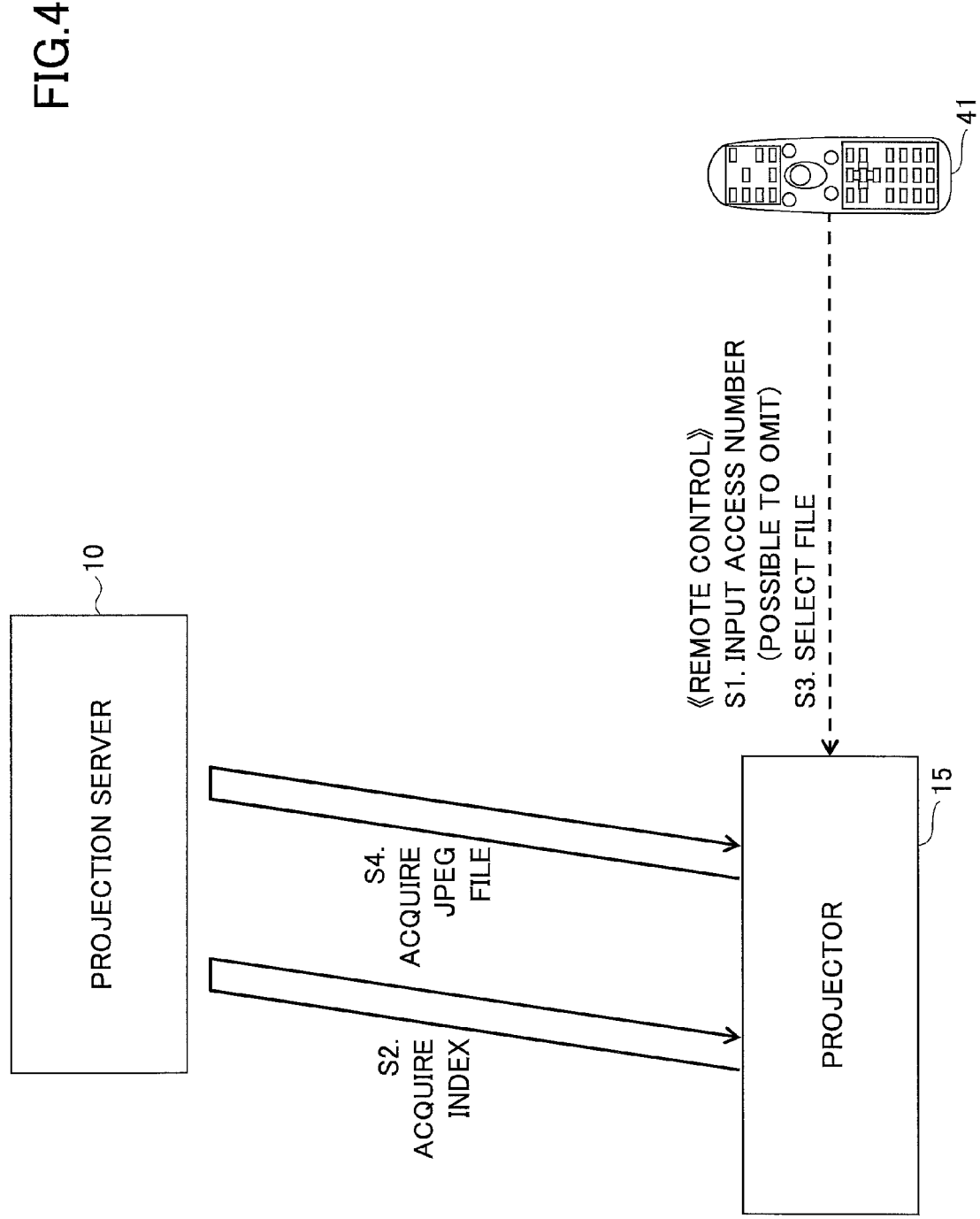
FIG. 4 generally shows one example of a procedure carried out between the projection server and a projector.

FIG. 4 generally shows one example of a procedure carried out between the projection server 10 and the projector 15. Note that, here, as one example of access restriction, an example where access restriction using an access number is set will be described. However, it is also possible to be able to select access restriction using an IC card, a fingerprint authentication device or the like.

The operator of the projector 15 inputs a start instruction (to project a file list screen page) to the projector 15, and then, in step S1, for example, operates a remote controller 41 to input an access number.

In step S2, the projector 15 acquires an index file from the projection server 10. The index file to be acquired from the projection server 10 includes information of content files stored in a manner of being associated with the access number.

The projector 15 generates a file list screen page from the index file acquired from the projection server 10 and projects it. Details of such a file list screen page will be described later.

In step S3, the operator of the projector 15 operates the remote controller 41 to select, from the thus projected file list screen page, a content file to be projected.

In step S4, the projector 15 acquires the content file thus designated by the operator from the projection server 10. The projector 15 generates a file projection screen page from the acquired content file and projects it.

In FIG. 4, an operator inputs the access number (passcode) to the projector 15, and thereby, the projector 15 generates a file list screen page of content files allowed to be projected by the operator. However, if an operation part of the projector 15 or the remote controller 41 is not one which is easy to operate, such an operation, of inputting an access number may be troublesome and inconvenient for the operator.

Therefore, according to the present embodiment, the projector 15 includes not only a function of determining content files that an operator is allowed to project but also a function of an operator being able to project a content file for which information is stored with information of the specific projector 15 in such a manner that they are associated with one another. Thus, the operator need not input an access number to the projector 15 and can project, by using the projector 15, a content file for which information is stored in the projection server 10 in a manner of being associated with the specific projector 15. Further, by stopping associating the specific projector 15 with the content file (i.e., stopping storing information of the content file and the specific projector 15 in a manner of associating them with one another), it becomes impossible to project the content file.

For example, before projecting a content file, the operator previously registers, in the projection server 10, a state where the content file is associated with the specific projector 15 by which the content file will be projected. Therefore, the operator need not input an access number to the projector 15 and can project from the projector 15 the content file that is registered in the projection server 10 in a manner of being associated with the specific projector 15.

<<Process by Dispatcher Part 32>>

The dispatcher part 32 receives a URL from the HTTP server part 31. The URL to be received is, for example, "http://projection.example.com/12345/" including an access number or "http://projection.example.com/aaa/" including an apparatus ID. The numerals "12345" in the above-mentioned URL is one example of an access number. Note that the characters "aaa" in the above-mentioned URL is one example of an apparatus ID.

When the operator of the projector 15 inputs a start instruction (to cause the projector 15 to project a file list screen page) to the projector 15, the dispatcher part 32 of the projection server 10 then receives, for example, a URL such as "http://projection.example.com/12345/" or http://projection.example.com/aaa/, from the projector 15.

When the operator of the projector 15 inputs selection of a subdirectory of an internal service from the file list screen page currently being thus projected by the projector 15, the dispatcher part 32 then receives a URL such as "http://projection.example.com/12345/local/" from the projector 15.

When the operator of the projector 15 inputs selection of a subdirectory of an external service from the file list screen page currently being thus projected by the projector 15, the dispatcher part 32 then receives a URL such as "http://projection.example.com/12345/ext1/" from the projector 15.

When the operator of the projector 15 inputs, to the projector 15, selection of a content file included in the thus selected subdirectory, the dispatcher part 32 then receives a URL such as "http://projection.example.com/12345/ext1/folder1/file1.jpg" from the projector 15.

The characters "projection.example.com" included in each of the above-mentioned URLs indicate one example of a host URL. The characters "local" included in the above-mentioned URL are information indicating an internal service. The characters and numeral "ext1" included in the above-mentioned URL are information indicating an external service.

Further, the characters and numeral "folder1" included in the above-mentioned URL are information indicating a subdirectory. The characters and numeral "file1.jpg" included in the above-mentioned URL are information indicating a content file. The characters and numeral "folder1" included in the above-mentioned URL are one example of a URL path inside an external service.

Figure 5:
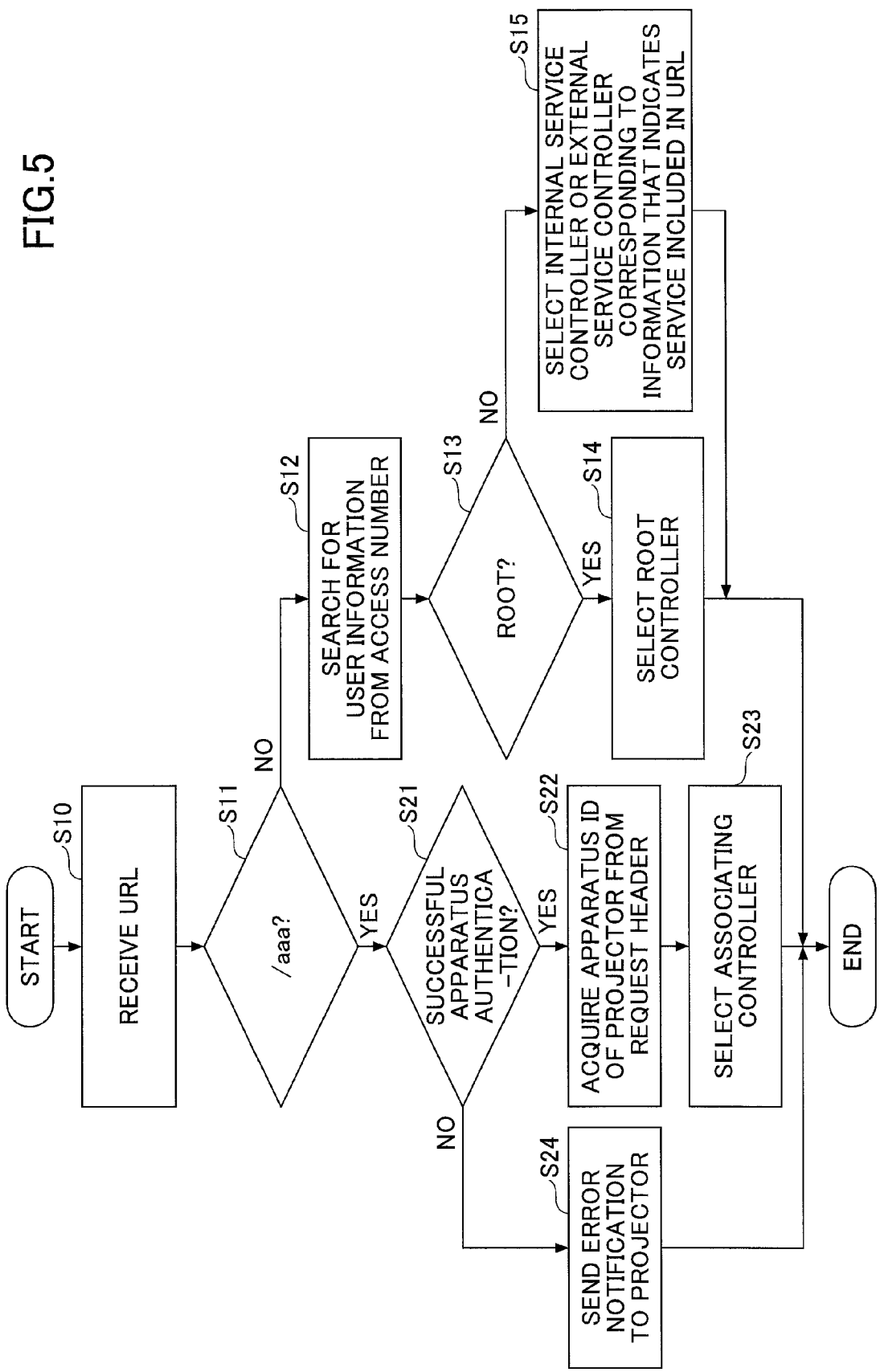
FIG. 5 is a flowchart showing one example of a procedure carried out by a dispatcher part.

The dispatcher part 32 distributes URLs such as those mentioned above from the HTTP server part 31 to the controller part 34 as shown in FIG. 5. FIG. 5 is a flowchart showing one example of a procedure carried out by the dispatcher part 32.

In step S10 of FIG. 5, the dispatcher part 32 receives a URL from the HTTP server part 31. In step S11, the dispatcher part 32 executes the process starting from step S12 when the received URL includes not an apparatus ID but an access number.

In step S12, the dispatcher part 32 searches the user management part 37 for a set of user information using the access number included in the received URL as a search key. Further, the dispatcher part 32 determines whether the received URL is a root URL in step S13.

The determination as to whether the received URL is a root URL is such that, when the received URL includes a host URL and the access number, it is possible to determine that the received URL is a root URL. It is also possible to determine whether the received URL is a root URL by using, for example, a distributing table in which respective URLs are associated with the root controller 45, the external service controller 16 and the internal service controller 47. A URL associated with the root controller 45 in the distributing table can be determined as a root URL.

When the received URL is a root URL, the dispatcher part 32 selects the root controller 45 of the controller part 34 and distributes the URL thereto in step S14. When the URL is not a root URL, the dispatcher part 32 executes the process of step S15.

In step S15, the dispatcher part 32 selects the external service controller 46 or the internal service controller 47 and distributes the URL thereto based on information such as "local" or "ext.1" indicating a corresponding service included in the received URL.

On the other hand, in step S11, when the URL received by the dispatcher part 32 includes an apparatus ID, the dispatcher part 32 executes the process starting from step S21. In step S21, the dispatcher part 32 determines whether apparatus authentication is successful based on the apparatus ID included in the received URL in step S21. Note that existing technology can be used to determine whether the apparatus authentication is successful.

When the apparatus authentication is successful, the dispatcher part 32 acquires the apparatus ID of the projector 15 included in the received URL in step S22. The dispatcher part 32 selects the associating controller 48 and distributes the URL thereto in step S23. When the apparatus authentication is not successful, the dispatcher part 32 transmits an error notification to the projector 15 in step S24.

The set of user information retrieved from the access number in step S12 has, for example, a configuration shown in FIG. 6. FIG. 6 is a configuration diagram of one example of user information. User information has, as its items, a user ID, a password, an access number and an available service. An "available service" is one in which an internal service(s) and/or an external service(s) which an operator of the projector 15 is allowed to use is set. In the example of FIG. 6, an operator having an access number "12345" (see FIG. 6, the item "access number") is allowed to use an internal service ("local") and an external service ("ext1").

<<Process by Root Controller 45>>

The root controller 45 generates a root index file including an internal service(s) and/or an external service(s) that a corresponding operator is allowed to use as a list of directories based on "available service" included in the set of user information retrieved in step S12.

FIG. 7 is a configuration diagram of one example of a root index file. A root index file shown in FIG. 7 includes, as a list of directories, an internal service(s) and an external service(s) that a corresponding operator is allowed to use.

The root controller 45 transmits the generated root index rile to the projector 15 via the HTTP server part 31. The projector 15 receives the root index file and displays a file list screen page. In the file list screen page, information of the directories corresponding to the internal service(s) and the external service(s) included in the root index file.

<<Process by External Service Controller 46>>

The process by the external service controller 46 differs depending on a specific external service. Therefore, here, one example of the process by the external service controller 46 will be generally described.

The external service controller 46 receives a URL thus distributed by the dispatcher part 32, and then, determines from the URL whether the received URL indicates an acquisition request for an index file. For example, the external service controller 46 determines that the received URL indicates an acquisition request for an index file when the received URL includes "/" at the end.

When thus determining that the received URL indicates an acquisition request for an index file, the external service controller 46 carries out a process of providing an index file. When determining that the received URL does not indicate an acquisition request for an index file, the external service controller 46 carries out a process of providing a content file. A process of providing an index file is carried out by the projection server 10 and the external Web service server 11 as one example of an apparatus providing an external service in cooperation with one another, <<Process by Internal Service Controller 47>>

The internal service controller 47 receives a URL thus distributed by the dispatcher part 32, and then, determines from the URL whether the URL indicates an acquisition request for an index file. For example, the internal service controller 47 determines that the received URL indicates an acquisition request for an index file when the received URL includes "/" at the end.

When determining that the received URL indicates an acquisition request for an index file, the internal service controller 47 carries out a process of providing an index file. When determining that the received URL does not indicate an acquisition request for an index file, the internal service controller 47 carries out a process of providing a content file.

<<Process by Associating Controller 48>>

The associating controller 48 receives a URL thus distributed by the dispatcher part 32, and then, determines from the URL whether the URL indicates an acquisition request for an index file. For example, the associating controller 48 determines that the received URL indicates an acquisition request for an index file when the received URL includes "/" at the end.

When determining that the received URL indicates an acquisition request for an index file, the associating controller 48 carries out a process of providing an index file. When determining that the received URL does not indicate an acquisition request for an index file, the associating controller 48 carries out a process of providing a content file. A process of providing an index file and a process of providing a content file use, for example, file information such as that shown in FIG. 8.

FIG. 8 is a configuration diagram of one example of file information. File information shown in FIG. 8 associates a file name, a user ID, a registration date and time, an apparatus ID of an apparatus to be used for projection, an associating date and time and a file path with each other. The associating controller 4, for example, searches for a set of file information using the apparatus ID of the projector 15 acquired in step S22 as a search key, generates an index file of files associated with the acquired apparatus ID in a JSON format, and provides the generated index file to the projector 15. Thus, file information associates the apparatus ID of the specific projector 15 with a file. Note that a process of associating the apparatus ID of the specific projector 15 with a file (or storing information concerning a file and the apparatus ID of the specific projector 15 in a manner of associating them with one another) will be described later.

Figure 9:
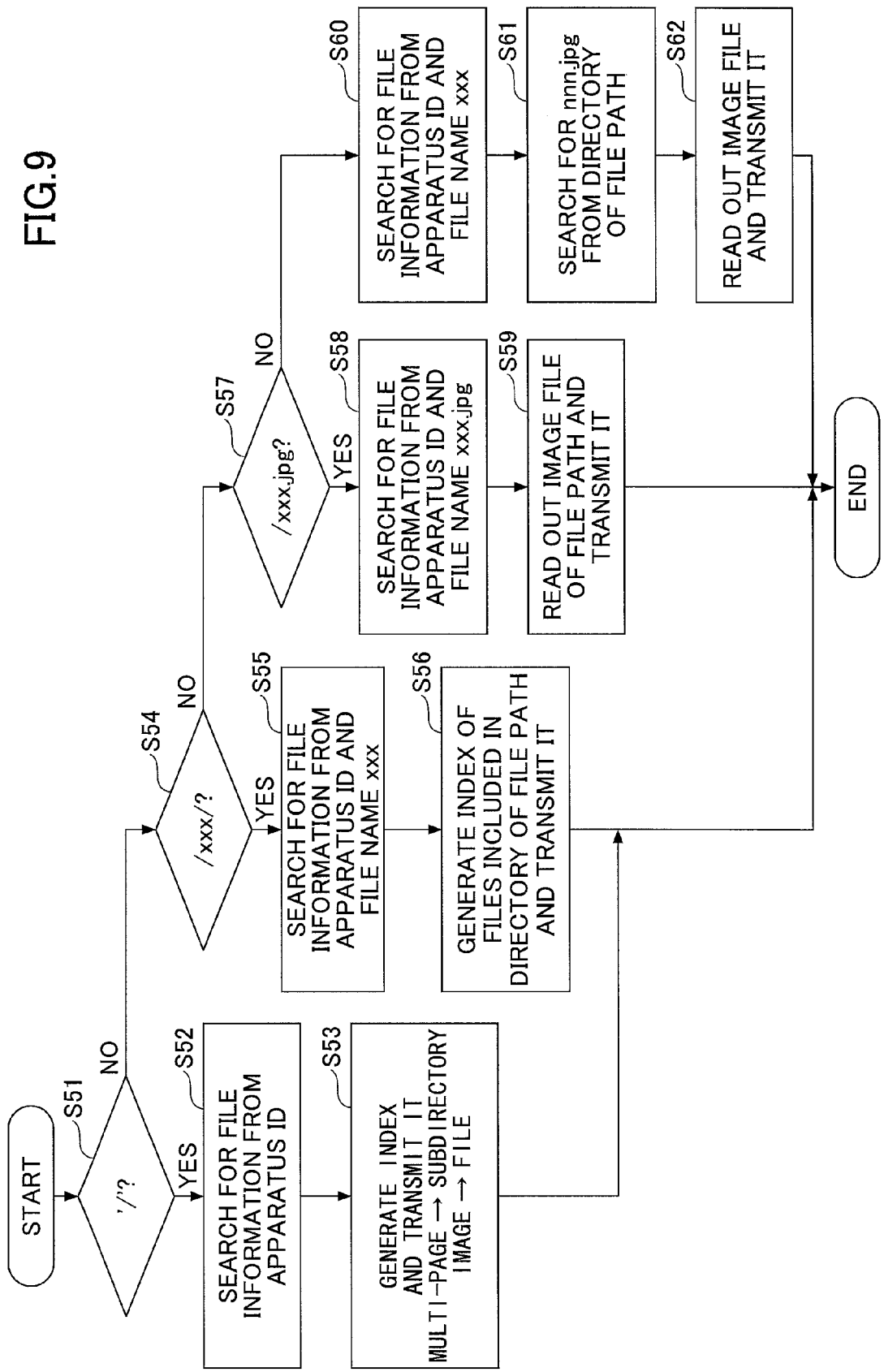
FIG. 9 is a flowchart showing one example of a process of transmitting a file.

The associating controller 48 carries out the above-mentioned process of providing an index file and a content file by a process of transmitting a file shown in FIG. 9. FIG. 9 is a flowchart showing one example of a process of transmitting a file. In step S51 of FIG. 9, the associating controller 48 determines whether a received URL includes "/" at the end.

When the received URL includes "/" at the end, the associating controller 48 searches for a set of file information such as that shown in FIG. 8 using the apparatus ID included in the URL as a search key in step S52. In the process of step S52, the associating controller 48 can retrieve sets of file information each having "apparatus ID of apparatus that projects image" the same as the apparatus ID included in the URL.

In step S53, the associating controller 48 generates an index file of a list based on the retrieved sets of file information. The associating controller 48 generates an index file of a list in which a multi-page file is expressed as a subdirectory and a file other than a multi-page file is expressed as a file. Then, the associating controller 48 transmits the generated index file to the projector 15.

Figure 10:
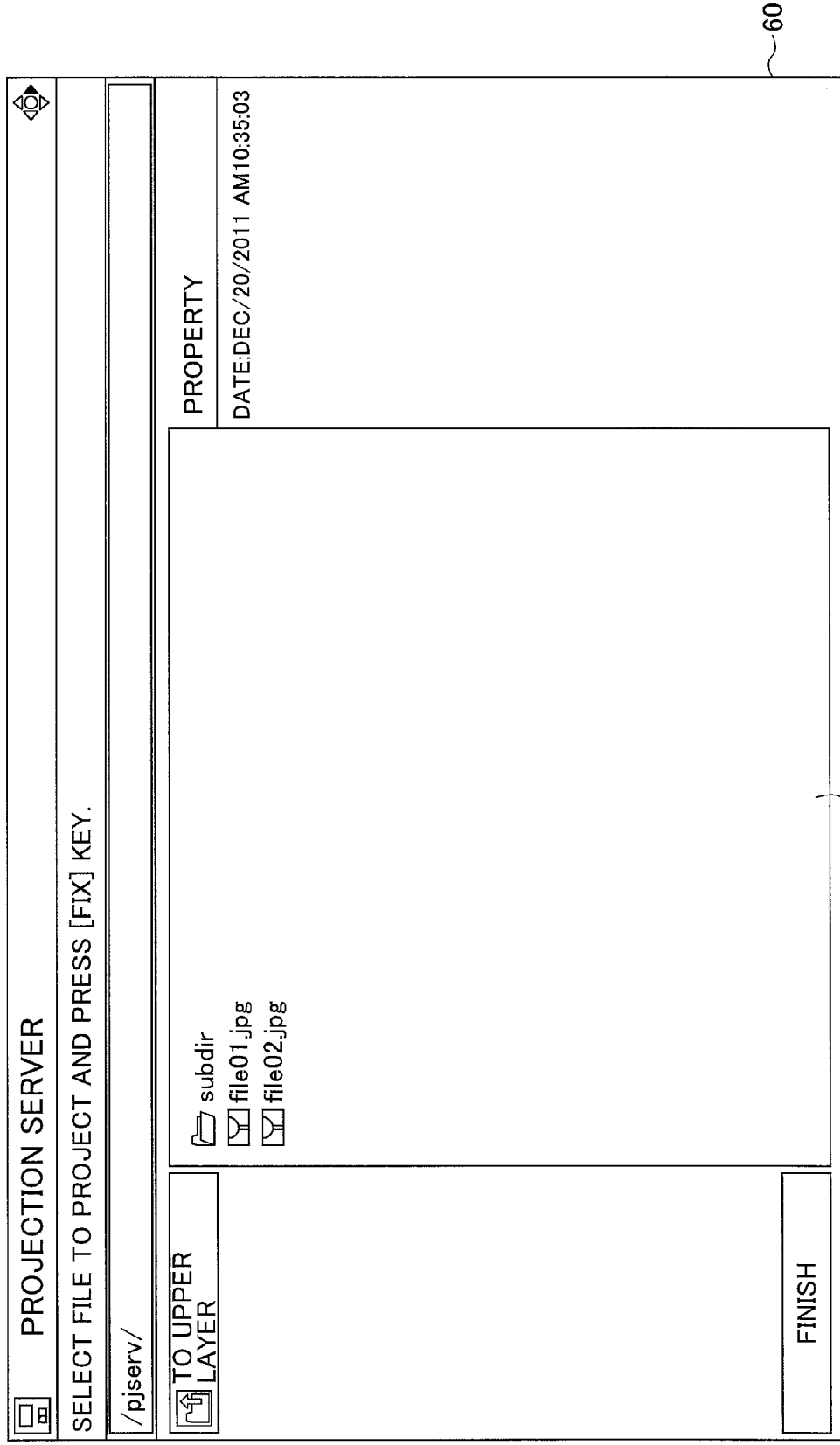
FIG. 10 is an image diagram of one example of a file list screen page.

The projector 15 receives the index file thus provided by the projection server 10 and displays a file list screen page, for example, such as that shown in FIG. 10. FIG. 10 is an image diagram of one example of a file list screen page. A file list screen page 60 of FIG. 10 includes a file list display field 61. The file list display field 61 of FIG. 10 shows a list of a subdirectory and files included in the index file.

On the other hand, when the received URL does not have "/" at the end in step S51, the associating controller 48 carries out the process of step S54. In step S54, the associating controller 48 determines whether the received URL matches a pattern including a subdirectory ("xxx" in FIG. 9) indicating a multi-page file. When the URL matches the pattern, the associating controller 48 searches for a set of file information such as that shown in FIG. 8 using the apparatus ID and the file name "xxx" included in the URL as search keys, in step S55.

By the process of step S55, the associating controller 48 can retrieve a set of file information each having "file name"

and "apparatus ID of apparatus that projects image" the same as the apparatus ID and the file name "xxx" included in the received URL.

In step S56, the associating controller 48 generates an index file including a list of files included in the directory identified by "file path" included in the thus retrieved set of file information and transmits it to the projector 15.

In step S54, when the URL does not match the pattern, the associating controller 48 carries out the process of step S57. In step S57, the associating controller 48 determines whether the received URL matches a pattern including an image file ("xxx.jpg" in FIG. 9).

When the URL matches the pattern in step S57, the associating controller 48 searches for a set of file information such as that shown in FIG. 8 using the apparatus ID and the file name "xxx.jpg" included in the URL in step S58 as search keys. By the process of step S58, the associating controller 48 can retrieve a set of file information having "file name" and "apparatus ID of apparatus that projects image" the same as the apparatus ID and the file name "xxx.jpg" included in the received URL.

In step S59, the associating controller 48 reads out an image file identified by "file path" included in the thus retrieved set of file information and transmits it to the projector 15.

When the URL does not match the pattern in step S57, in other words, when the URL includes information indicating an image file (page) in a multi-page file (for example, "/xxx/nnn.jpg"), the associating controller 48 carries out the process of step S60. In step S60, the associating controller 48 searches for a set of file information such as that shown in FIG. 8 using the apparatus ID and the file name "xxx" included in the URL as search keys.

By the process of step S60, the associating controller 48 can retrieve a set of file information having "file name" and "apparatus ID of apparatus that projects image" the same as the apparatus ID and the file name "xxx" included in the received URL.

In step S61, the associating controller 48 searches the directory identified by the file path included in the thus retrieved set of file information for an image file "nnn.jpg" included in the received URL. In step S62, the associating controller 48 reads out the thus retrieved image file as one requested by the received URL, and provides the read out image file to the projector 15.

Note that when the associating controller 48 cannot retrieve file information in step S55, S58 or S60, it is possible that the associating controller 48 sends an error notification to the projector 15. Further, the process shown in the flowchart of FIG. 9 is an example of transmitting a list of files associated with the apparatus ID of the projector 15. However, it is also possible that, for example, based on "associating date and time" included in file information, the latest file can be transmitted instead.

When the latest file is thus to be transmitted, for example, the associating controller 48 searches the sets of file information each having "apparatus ID of apparatus that projects image" the same as the apparatus ID included in the URL for the set of file information having "associating date and time" that is latest, in step S52. The associating controller 48 in this case carries out the process of step S56 subsequent to step S52, and thus, can generate an index file of the latest file and transmit it to the projector 15.

<<Process of Uploading File>>

Figure 11:
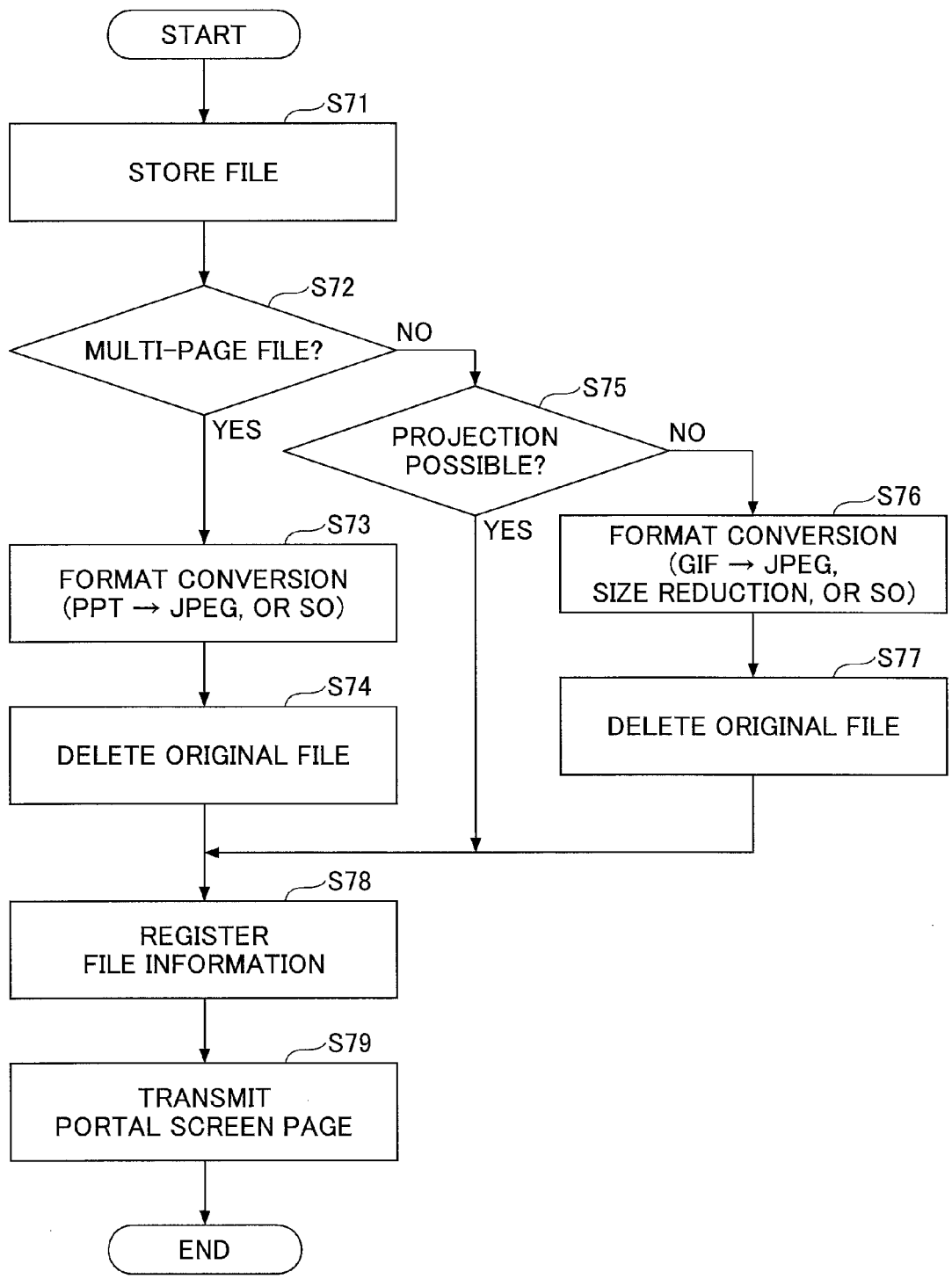
FIG. 11 is a flowchart of one example of a process of uploading a file.

FIG. 11 is a flowchart of one example of a process of uploading a file. The internal service controller 47 of FIG. 3 has a function of uploading a file and is capable of storing, in an internal storage, a file uploaded from the browser operating in the PC 13 or so.

For example, the browser in the PC 13 sends a POST request for a file to a URL (for example, http://projectionportal.example.com/upload) prepared for uploading, and thus, can request uploading of the file. The operator of the PC 13 sends a corresponding request by carrying out login from a portal page of FIG. 12A, described, later, selecting the file and a mode, and then, clicking an upload button.

The internal service controller 47 receives the URL prepared for uploading via the dispatcher part 32, and then in step S71, stores the file uploaded by the POST request in the internal storage.

In step S72, the internal service controller 47 determines whether the file thus stored in the internal storage is a multi-page file. When the file is a multi-page file, the internal service controller 47 converts the multi-page file into a file of a JPEG format, for example, such as to be able to be projected by the projector 15 in step S73. In step S74, the internal service controller 47 deletes the multi-page file (original one) after the conversion.

Then, the internal service controller 47 registers a set of file information such as that shown in FIG. 8 in step S78. Note that, in step S78, no apparatus ID is registered in the field of "apparatus ID of apparatus that projects image" of the set of file information. Associating the content file with the projector 15 (i.e., storing information of the content file and the projector 15 in a manner of associating them with one another) is carried out in an "associating process" described later. In step S79, the internal service controller 47 causes the browser in the PC 13 which sent the request for uploading the file to display a portal screen page.

On the other hand, when the file is not a multi-page file in step S72, the internal service controller 47 carries out the process of step S75. In step S75, the internal service controller 47 determines whether the file stored in the internal storage has a format such as to be able to be directly projected by the projector 15. When the file has a format able to be directly projected by the projector 15, the internal service controller 47 carries out the process of steps S78 and S79.

Note that if the file stored in the internal storage does not have a format able to be directly projected by the projector 15 in step S75, the internal service controller 47 converts the file having a format not being able to be directly projected by the projector 15 info a file of a JPEG format or so being able to be directly projected by the projector 15 in step S76. The internal service controller 47 deletes the file having a format not being able to be directly projected by the projector 15 (original file) in step S77. Then, the internal service controller 47 carries out the above-mentioned process of steps S78 and S79.

FIGS. 12A and 12B are image diagrams of one example of portal screen pages after login. FIG. 12A shows one example of a portal screen page after login. A portal screen page after login of FIG. 12A includes the "user ID" concerning the login, a "change setting" link, a "logout" link, a UI for an internal service that includes a button for selecting a file to be uploaded ("refer to"), a mode selection button ("project only once" and "project for limited time") and an upload instruction button ("upload") and a link to a file management screen page ("to file management screen page"). When the operator of the PC 13 clicks for the "change setting" link, the projection server 10 causes the browser of the PC 13 to display a "setting change screen page". FIG. 12B is an image diagram of one example of a "setting change screen page". A "setting change screen page" of FIG. 12B includes respective items of a "user ID", a "password", an "access number" and an "available service". It is possible to generate an "access number" using, for example, a random number, at a time of user registration. An "access number" can be changed by using a "change" button in the setting change screen page.

The operator of the PC 13 operates, for example, a check box for "available service" in the setting change screen page (see FIG. 12B) of the portal screen page after login, and thereby can change a setting for cooperation with an external service. The browser of the PC 13 responds thereto and requests "external cooperation setting change" to the projection server 10. The projection server 10 then returns, to the browser of the PC 13, information concerning a confirmation of an access to the external service with which the setting for cooperation is to be changed, a URL of the external service and a URL of a portal screen page to be displayed after the confirmation of an access to the external service.

<<Associating Process>>

FIG. 13 is a sequence diagram of one example of an associating process. FIG. 14 is a screen page transition diagram at a time of an associating process. Hereinafter, an example will be described where the operator carries out an associating process from a smartphone 21 that is an example of an operation terminal capable of carrying out communication with the projection server 10.

The operator operates the smartphone 21 and displays a login screen page 71 of FIG. 14 thereon. That is, in response to the operator's operation, the smartphone 21 displays the login screen page 71. Note that, for example, an application program installed in the smartphone 21 causes the smartphone 21 to carry out the process shown in FIG. 13.

In step S81, the operator inputs a user ID and a password from the login screen page 71 and presses a "login" button. In step S82, the smartphone 21 transmits the user ID and the password which are thus input to the projection server 10 and sends a login request thereto.

In step S83, the projection server 10 carries out authentication for login using the received user ID and password. When the authentication is successful (the operator is thus logged in), the projection server 10 searches for sets of file information such as that shown in FIG. 8 using the user ID as a search key in step S84. The projection server 10 extracts, from the retrieved sets of file information, image files and multi-page files and generates a file list thereof.

In step S85, the projection server 10 transmits the generated file list to the smartphone 21. In step S86, the smartphone 21 displays a file selection screen page 72 of FIG. 14. In the file selection screen page 72 of FIG. 14, the file list of the image files (for example, "photo01.jpg") and the multi-page files (for example, "presentation.ppt") previously uploaded by the operator who has thus logged in is displayed.

In step S87, the operator selects, from the file selection screen page 72, an image file and/or a multi-page file to be associated with the projector 15, and presses an "OK" button. In step S88, the smartphone 21 stores the file name(s) of the image file and/or the multi-page file thus selected by the operator.

In step S89, the smartphone 21 displays a projector designation screen page 74 of FIG. 14. In step S90, the operator designates the apparatus ID of the projector 15 to be associated with the image file and/or the multi-page file selected in step S87 from the projector designation screen page 74 and presses an "OK" button.

In step S91, the smartphone 21 transmits the thus designated apparatus ID and the file name(s) of the thus selected image file and/or multi-page file to the projection server 10 and sends an associating request. In step S92, the projection server 10 carries out, for example, the following associating operations.

First, the projection server 10 searches for a set(s) of file information such as that shown in FIG. 8 using, as search keys, the user ID of the operator who succeeds in the authentication in step S83 and the file name(s) for which the associating request is sent in step S91.

Then, the projection server 10 sets the apparatus ID for which the associating request is sent in step S91 as the "apparatus ID of apparatus that projects image" included in the thus retrieved set(s) of file information. Note that, when the retrieved set(s) of file information includes a set of file information corresponding to a multi-page file, the projection server 10 also sets the apparatus ID for which the associating request is sent in step S91 as the "apparatus ID of apparatus that projects image" included in the sets of file information corresponding to the image files included in the multi-page file.

When the associating operations are thus finished, the projection server 10 transmits information of "OK" to the smartphone 21 in step S93. In step S94, the smartphone 21 displays an "associating screen page" 73 of FIG. 14. In the associating screen page 73 of FIG. 14, the apparatus ID of the projector 15 and the file names of the files thus associated with the projector 15 having the apparatus ID (i.e., the file names being stored with the apparatus ID in a manner of being associated with each other) are displayed.

Further, in step S95, when the operator wants to stop associating the apparatus ID of the projector 15 with the file name (i.e., to stop storing the file name in a manner of associating the file name with the apparatus ID), the operator presses a "stop" button in the associating screen page 73 of FIG. 14. When the stop button is thus pressed, the smartphone 21 transmits the file name to the projection server 10 and sends a stop request thereto in step S96.

In step S97, the projection server 10 stops the associating as follows, for example. First, the projection server 10 searches for sets of file information such as that shown in FIG. 8 using the user ID of the operator who succeeds in the authentication in step S83 and the file names for which the stop request is sent in in step S96 as search keys. Then, the projection server 10 deletes the apparatus ID that is set as the "apparatus ID that project an image" included in the thus retrieved sets of file information. Note that, when the retrieved sets of file information includes a set of file information corresponding to a multi-page file, the projection server 10 deletes also the apparatus ID that is set as the "apparatus ID that project an image" included in the sets of file information corresponding to the image files included in the multi-page file.

When thus the operations of stopping the associating are finished, the projection server 10 transmits information of "OK" to the smartphone 21 in step S98. In step S99, the smartphone 21 displays the file selection screen page 72 of FIG. 14.

Immediately before projection by the projector 15, the operator carries out operations from the file selection screen page 72 and the projector designation screen page 74 of FIG. 14 near the projector 15. In a state where the apparatus ID of the projector 15 is associated with the file names (i.e., the file names are stored in a manner of being associated with the apparatus ID of the projector 15), the associating screen page 73 is displayed on the smartphone 21.

The sequence diagram of FIG. 13 shows a process for a case of associating the projector 15 with an image file(s) or a multi-page file(s) individually. It is also possible that an associating process is such that, as shown in the sequence diagram of FIG. 15, all of the files uploaded by the operator are associated (i.e., information of which is stored in a manner of being associated).

Figure 15:
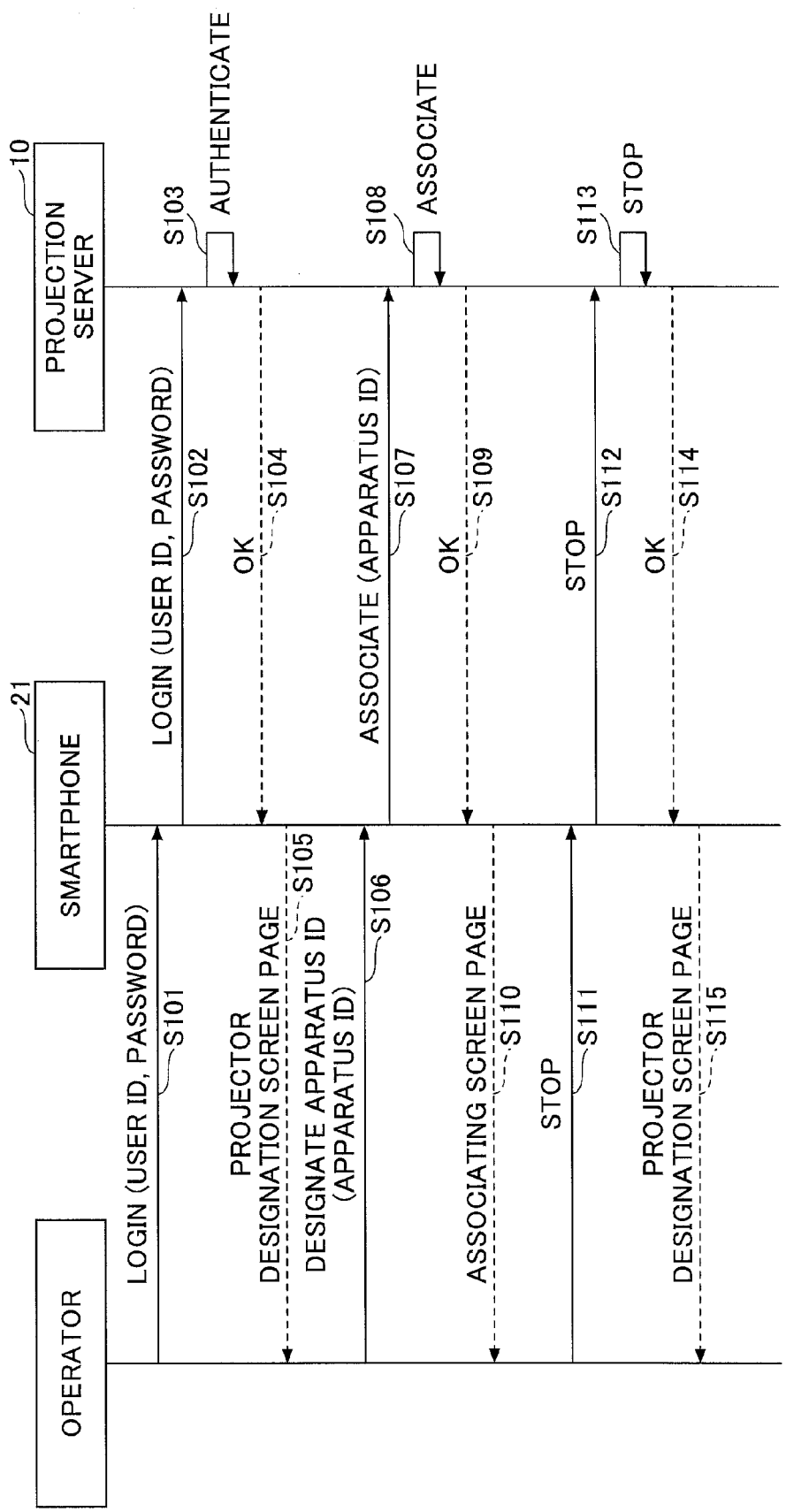
FIG. 15 is a sequence diagram of an associating process in another example.
Figure 16:
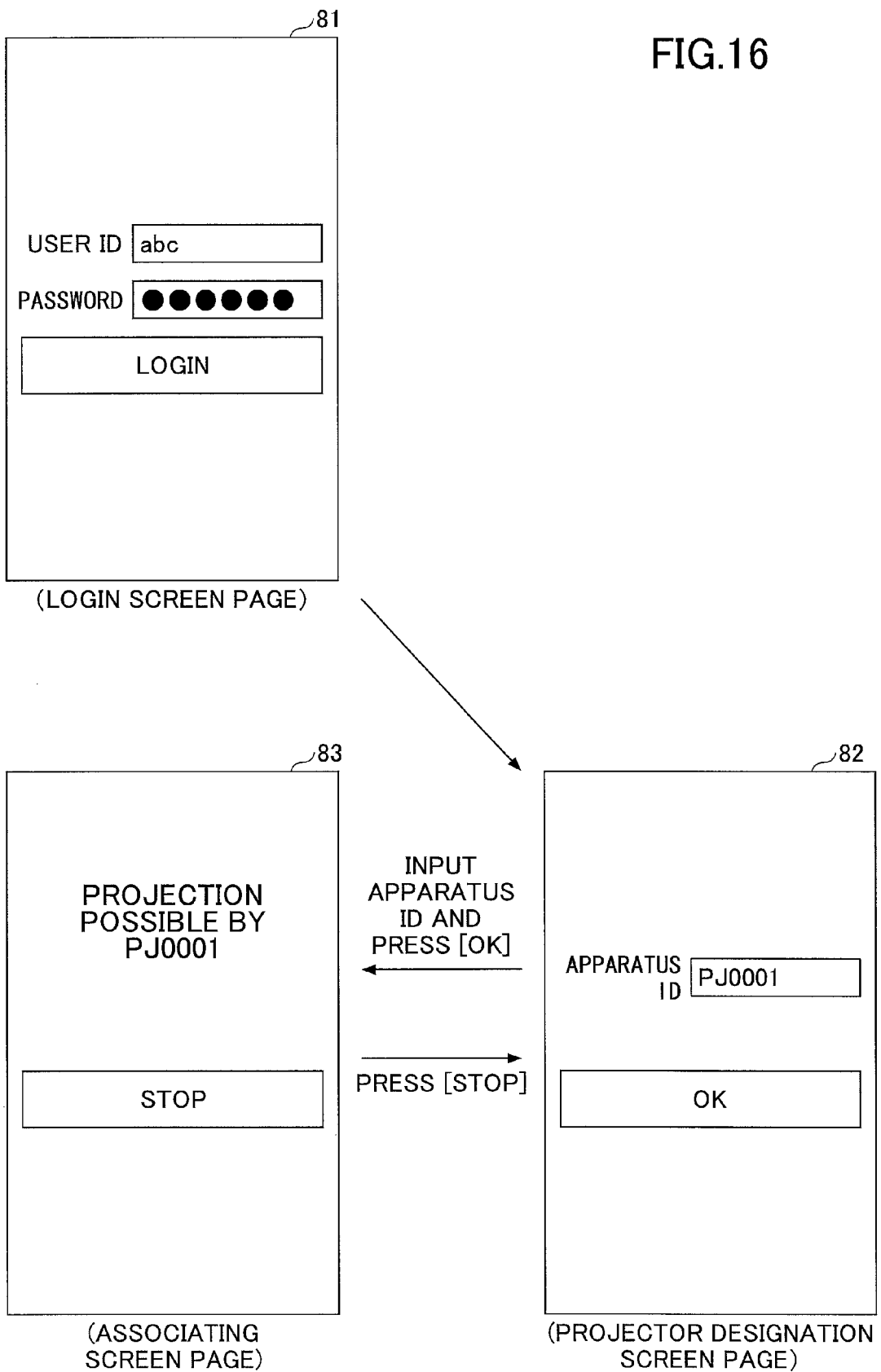
FIG. 16 is a screen page transition diagram at a time of the associating process in the example of FIG. 15.

FIG. 15 is a sequence diagram of an associating process in another example. FIG. 16 is a screen page transition diagram at a time of the associating process in the example of FIG. 15. Note that the sequence diagram of FIG. 15 is the same as the sequence diagram of FIG. 13 except for a part. Also, the screen page transition diagram of FIG. 16 is the same as the screen page transition diagram of FIG. 14 except for a part.

The operator operates the smartphone 21 to display a login screen page 81 of FIG. 16 on the smartphone 21. In response to the operator's operation, the smartphone 21 displays the login screen page 81. In step S101 of FIG. 15, the operator inputs a user ID and a password into the login screen page 81 and presses a "login" button. In step S102, the smartphone 21 transmits the user ID and the password to the projection server 10 and sends a login request thereto. In step S103, the projection server 10 carries out authentication by using the received user ID and password for login.

When the authentication is successful, the projection server 10 transmits information of "OK" to the smartphone 21 in step S104. In step S105, the smartphone 21 displays a projector designation screen page 82 of FIG. 16. In step S106, the operator designates the apparatus ID of the projector 15 to be associated with files uploaded into the projector designation screen page 82 and presses an "OK" button.

In step S107, the smartphone 21 transmits the apparatus ID thus designated in the projector designation screen page 82 to the projection server 10 and sends an associating request thereto. In step S108, the projection server 10 carries out associating operations as follows, for example.

First, the projection server 10 searches for sets of file information such as that shown in FIG. 8 using the user ID of the operator who thus succeeds in the authentication as a search key. The projection server 10 sets the apparatus ID for which the associating request is thus sent in step S107 as the "apparatus ID of apparatus that projects image" included in the thus retrieved sets of file information.

When the associating operations are thus finished, the projection server 10 transmits information of "OK" to the smartphone 21 in step S109. In step S110, the smartphone 21 displays an associating screen page 83 of FIG. 16. In the associating screen page 83 of FIG. 16, the apparatus ID of the projector 15 with which the files uploaded by the operator are associated (i.e., with which information of the files uploaded by the operator is stored in a manner of being associated) is displayed.

Further, in step S111, when the operator wants to stop associating the uploaded files with (i.e., to stop storing information of the uploaded files in a manner of associating them with) the apparatus ID of the projector 15, the operator presses the "stop" button in the associating screen page 83 of FIG. 15.

When the stop button is thus pressed, the smartphone 21 sends a stop request to the projection server 10 in step S112. In step S113, the projection server 10 stops the associating as follows, for example.

First, the projection server 10 searches for a set of file information such as that shown in FIG. 8 using the user ID of the operator who thus succeeds in the authentication as a search key. The projection server 10 deletes the apparatus ID that is set as the "apparatus ID of apparatus that projects image" included in the thus retrieved set of file information.

When the operations of stopping associating are thus finished, the projection server 10 transmits information of "OK" to the smartphone 21 in step S114. In step S115, the smartphone 21 displays the projector designation screen page 82 of FIG. 16.

The sequence diagram of FIG. 15 shows a process for a case of associating all the files uploaded by the operator. Note that the apparatus IDs are set as "apparatus ID of apparatus that projects image" of all the sets of file information such as that shown in FIG. 8 corresponding to the files uploaded by the operator. However, it is also possible that a table is separately provided for associating user IDs and apparatus IDs with each other. According to the process shown in the sequence diagram of FIG. 15, the operator is free from troublesome file selecting.

Designation of the projector 15 by using the projector designation screen page 74 of FIG. 14 and the projector designation screen page 82 of FIG. 16 is implemented by inputting the corresponding apparatus ID. By using user information of FIG. 17 instead of user information of FIG. 6, the projection server 10 can designate a projector 15 from among the list or the projectors 15 previously used by the operator.

FIG. 17 is a configuration diagram of user information in another example, user information of FIG. 17 is such that, to the items of user information of FIG. 6, the apparatus IDs ("apparatus ID") of the apparatuses that are used previously and comments ("comment") therefor ("apparatus used for projection") are added as new items. In user information of FIG. 17, thus, the apparatus IDs of the projectors previously used by the operator for projection and the comments concerning these projectors are added.

Figure 18:
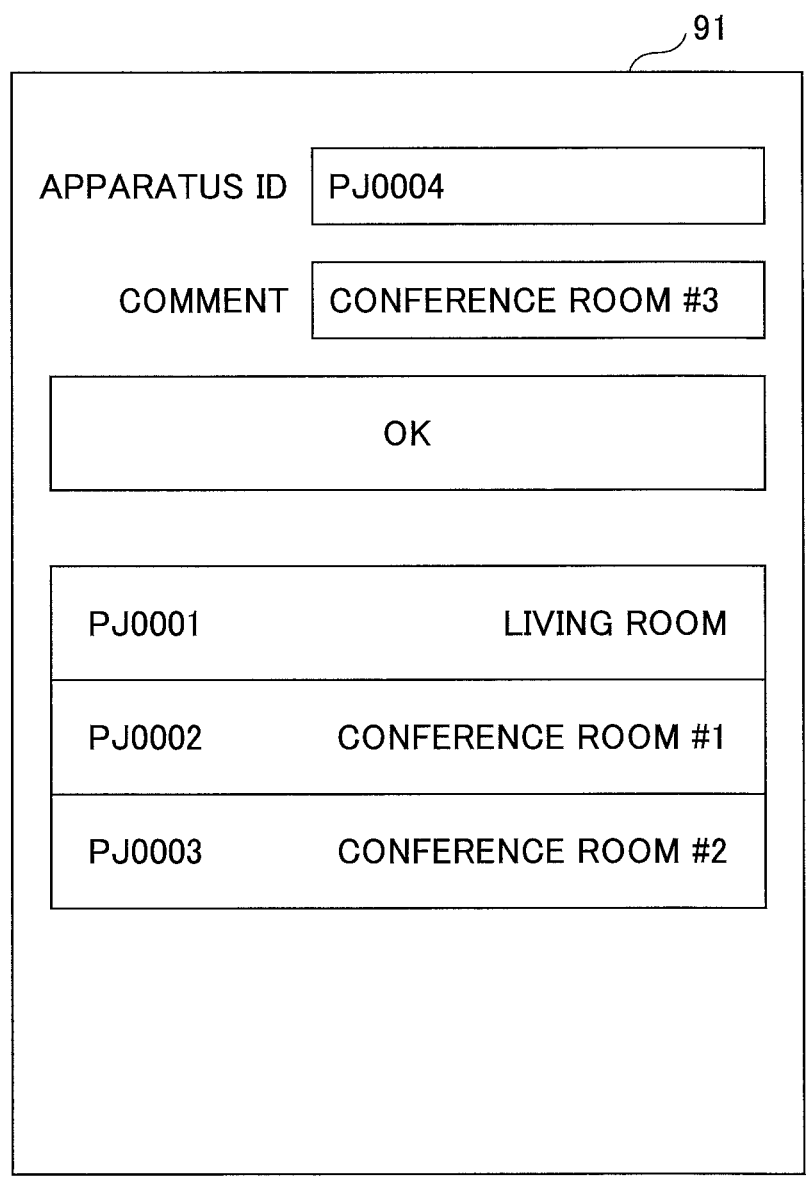
FIG. 18 is an image diagram of one example of a projector designation screen page.

By using user information of FIG. 17, the smartphone 21 can display, for example, a projector designation screen page 91 such as that shown in FIG. 18. In the projector designation screen page 91, the list of the projectors that are previously used by the operator is included together with the comments. Therefore, the operator is free from troublesome apparatus ID inputting when again using a previously used projector.

The sequence diagram of FIG. 15 shows a process for a case of associating all the files uploaded by the operator. In the associating process in step S108 of FIG. 15, the user ID of the operator who succeeds in the authentication is used as a search key and sets of file information such as that shown in FIG. 8 are searched for. Note that, it is also possible that the associating process in step S108 of FIG. 15 is such that, as shown in a flowchart of FIG. 19, the latest file uploaded by the operator is associated.

Figure 19:
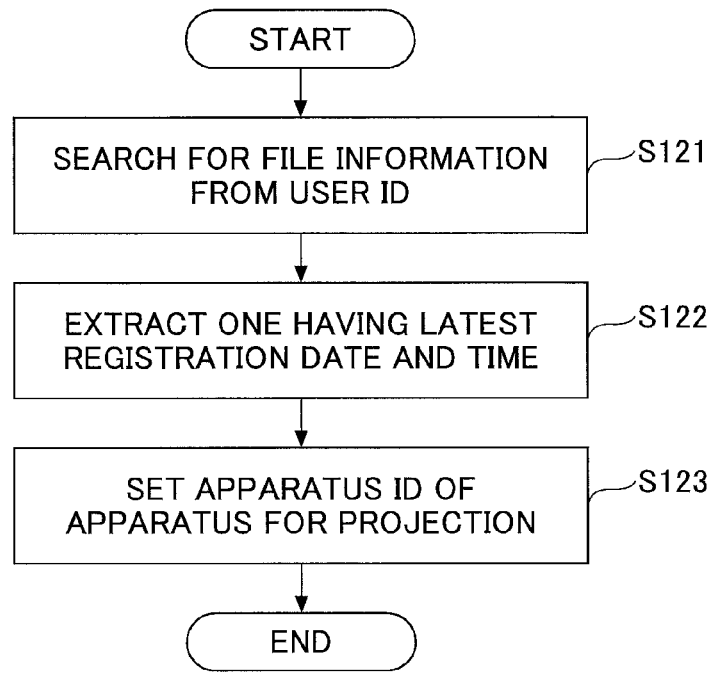
FIG. 19 is a flowchart of a process of associating in step S108 in another example.

FIG. 19 is a flowchart of the process of associating in step S108 in another example. In step S121 of FIG. 19, the projection server 10 searches for sets of file information such as that shown in FIG. 8 using the user ID of the operator who succeeds in the authentication as a search key. The projection server 10 then extracts the set of file information, from among the thus retrieved sets of file information, which has the latest "registration date and time", in step S122.

Then, the projection server 10 can set the apparatus ID (of an apparatus that is to project an image) for which the associating request is sent as "apparatus ID of apparatus that projects image" included in the set of file information having the latest "registration date and time". Therefore, according to the process of FIG. 19, the operator is free from troublesome file selecting.

The sequence diagram of FIG. 13 shows a process for a case of individually associating the projector 15 with an image file or a multi-page file. In the process of generating a file list in step S84 of FIG. 13, from among sets of file information retrieved from the search carried out using the user ID of the operator who succeeds in the authentication as a search key, image files and multi-page files are extracted and a file list thereof is generated.

Figure 20:
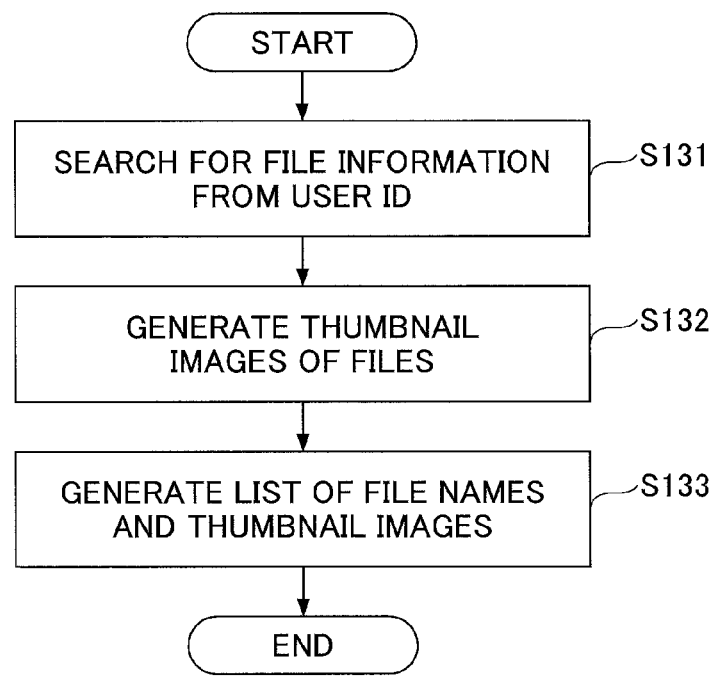
FIG. 20 is a flowchart of a process of creating a file list in step S84 in another example.

Note that, it is also possible that the generation of a file list in step S84 is such that, in addition to a file list, thumbnail images are generated for the files, for example, as shown in a flowchart of FIG. 20. FIG. 20 is a flowchart of a process of generating a file list in step S84 (of FIG. 13) in another example.

In step S131 of FIG. 20, the projection server 10 searches for sets of file information such as that shown in FIG. 8 using the user ID of the operator who succeeds in the authentication as a search key. In step S132, the projection server 10 extracts image files and multi-page files from the thus retrieved sets of file information. The projection server 10 generates thumbnail images of the thus extracted image files and multi-page files.

In step S133, the projection server 10 generates a file list that is a list of the file names and the thus generated thumbnail images of the thus extracted image files and multi-page files. Therefore, the projection server 10 can transmit the file list that is the list of the file names and the thumbnail images to the smartphone 21.

Figure 21:
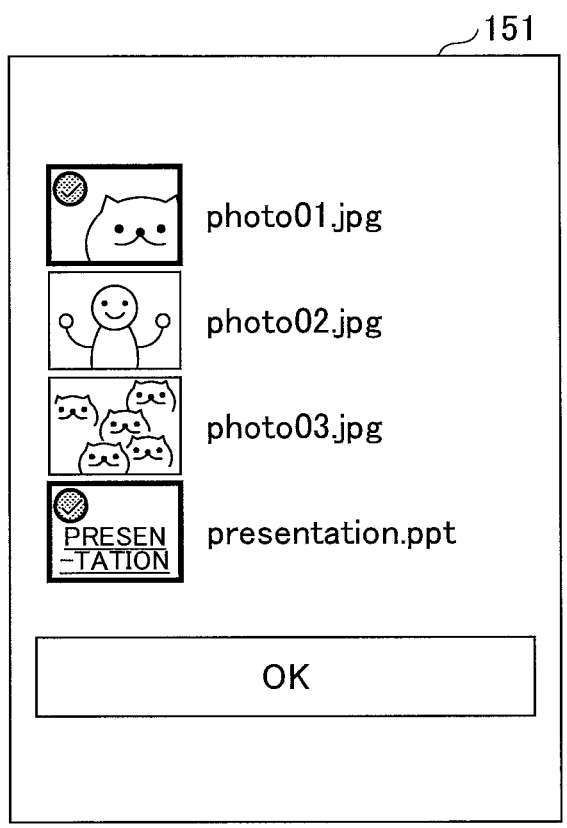
FIG. 21 is an image diagram of a file selection screen page in another example.

The smartphone 21 receives the file list that is the list of the file names and the thumbnail images and displays a file selection screen page 151 such as that shown in FIG. 21. FIG. 21 is an image diagram of a file selection screen page in another example. By using the file selection screen page 151 of FIG. 21, the operator can select an image file or a multi-page file to be associated (i.e., information of which is stored in a manner of being associated) with the projector 15 from the file selection screen page 151, while referring to the thumbnail images. Therefore, the operator can easily find a desired file from the file selection screen page 151.

The sequence diagram of FIG. 13 shows a process for a case where different operators can associate files with the common projector 15. Note that, it is also possible that the associating process in step S92 of FIG. 13 is such that, as shown in flowchart of FIG. 22, it is prevented to associate an apparatus ID already associated with a file.

Figure 22:
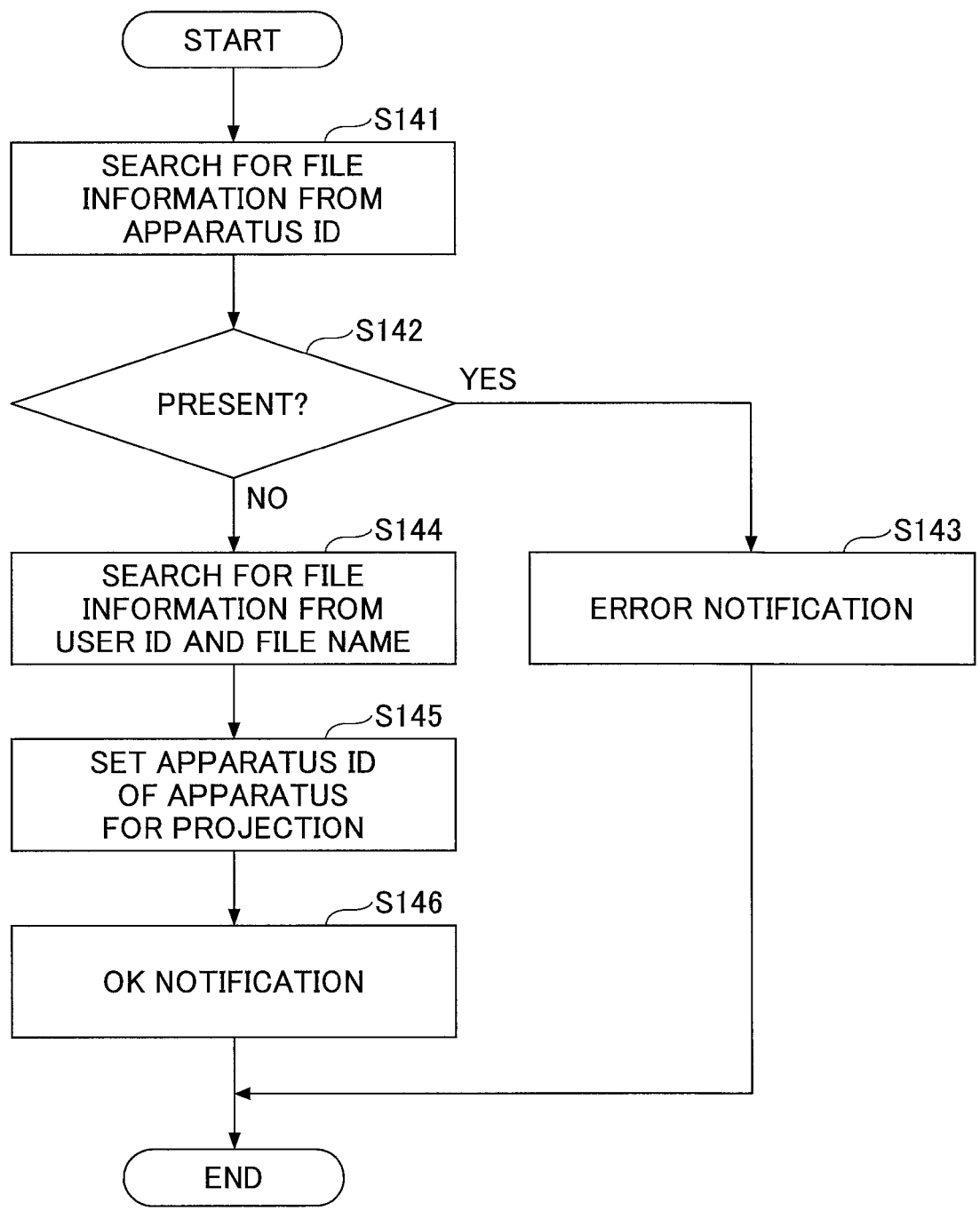
FIG. 22 is a flowchart of a process of associating in step S92 in another example.
Figure 23:
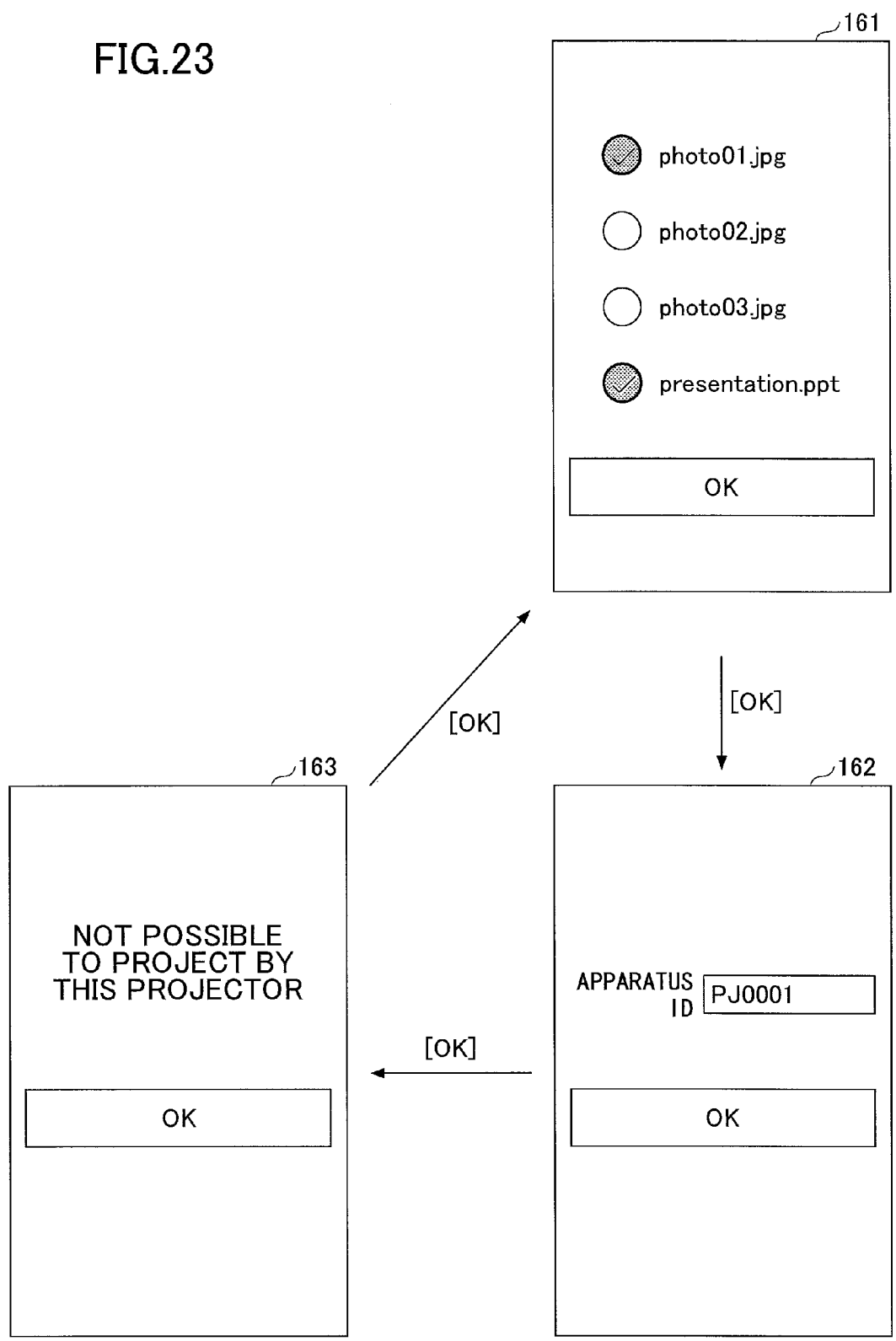
FIG. 23 is a screen page transition diagram at a time of an associating process in the example of FIG. 22.

FIG. 22 is a flowchart of a process of associating in step S92 in another example. FIG. 23 is a screen page transition diagram at a time of an associating process in the example of FIG. 22. In this case, the operator selects an image file or a multi-page file to be associated with the projector 15 from a file selection screen page 161 in FIG. 23. Further, the operator designates the apparatus ID of the projector 15 to foe associated (i.e., information of which is stored in a manner of being associated) with the thus selected image file or multi-page file in a projector designation screen page 162. The smartphone 21 transmits the thus designated apparatus ID and the file name of the thus selected image file or multi-page file to the projection server 10 and sends an associating request thereto.

The projection server 10 carries out associating as shown in FIG. 22, for example. In step S141 of FIG. 22, the projection server 10 searches for sets of file information such as that shown in FIG. 8 using the apparatus ID as a search key. In step S142, the projection server 10 determines whether any set of file information is retrieved in step S141.

When a set of file information is retrieved in step S141, the projection server 10 proceeds to step S143. Since this means that the apparatus ID is already associated with another file, the projection server 10 sends an error notification to the smartphone 21. The smartphone 21 receives the error notification and displays an error screen page 163 of FIG. 23. As a result, the operator cannot associate a new file with the apparatus ID already associated with another file.

When no file information is retrieved in step S141, the projection server 10 proceeds to step S144 from step S142. In this case, the projection server 10 searches for a set of file information such as that shown in FIG. 8 using the user ID of the operator who succeeds in the authentication and the file name for which the associating request is sent as search keys. In step S145, the projection server 10 sets the apparatus ID for which the associating request is set as the "apparatus ID of apparatus that projects image" included in the thus retrieved set of file information. In step S146, the projection server 10 transmits information of "OK" to the smartphone 21.

Therefore, when an operator designates a projector having the apparatus ID that is already set as the "apparatus ID of apparatus that projects image" of a set of file information (i.e., that is an apparatus ID already associated with a file by another operator), the operator cannot associate a new file (i.e., cannot store information of a new file in a manner of associating the new file) with the projector having the same apparatus ID, and thus, cannot project the file.

Thus, the flowchart of FIG. 22 shows a process for a case where different operators are not allowed to associate the same projector with files. Note that, it is possible that whether different operators are allowed to associate the same projector with files (i.e., whether to allow another operator to project an image by using the same project) is set from a projector designation screen page 171 of FIG. 24, for example.

Figures 24, 25:
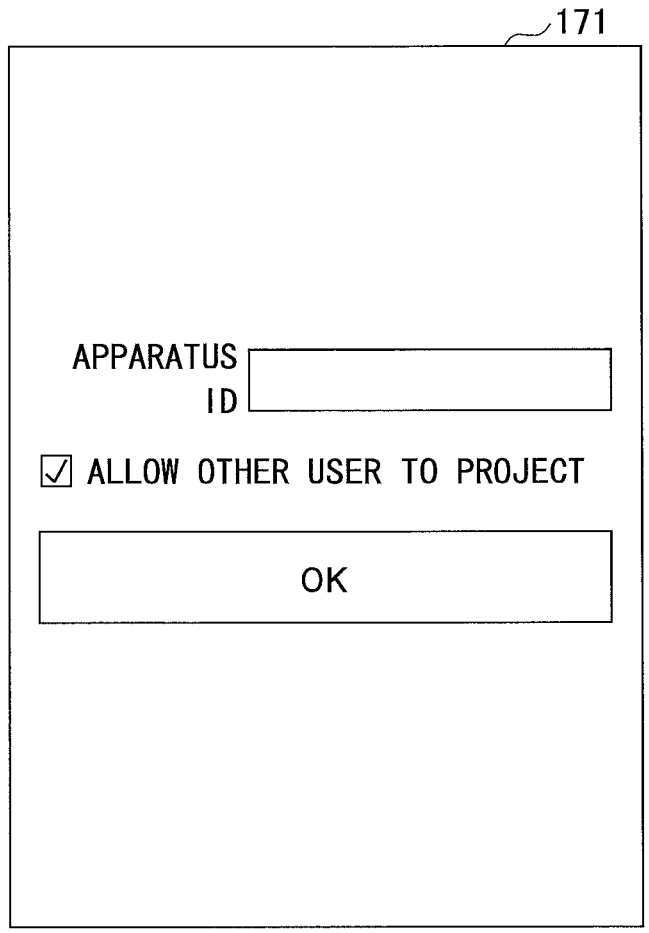
FIG. 24 is an image diagram of a projector designation screen page in another example.
FIG. 25 is a configuration diagram of one example of apparatus information.

FIG. 24 is an image diagram of a projector designation screen page in another example. The projector designation screen page 171 of FIG. 24 is such that when the operator designates the apparatus ID of the projector 15 to be associated with a selected image file or multi-page file, the operator can also set whether to allow another operator to project an image by using the same projector, together.

Information that is thus set from the projector designation screen page 171 of FIG. 24 concerning "whether to allow another user to project by using the same projector" is managed as "apparatus information" such as that shown in FIG. 25. FIG. 25 is a configuration diagram of one example of apparatus information. The apparatus information of FIG. 25 has items of "apparatus ID" and "allow other user to project". For the item "allow other user to project", information as to "whether to allow another user to project by using the same projector" is set by an operator from the projector designation screen page 171.

For example, when a sign "X" is set in the item "allow other user to project", an operator is not allowed to associate a new file with the projector 15 having the apparatus ID that is set in the item "apparatus ID", and thus, cannot project the file by using the same projector 15.

Figure 26:
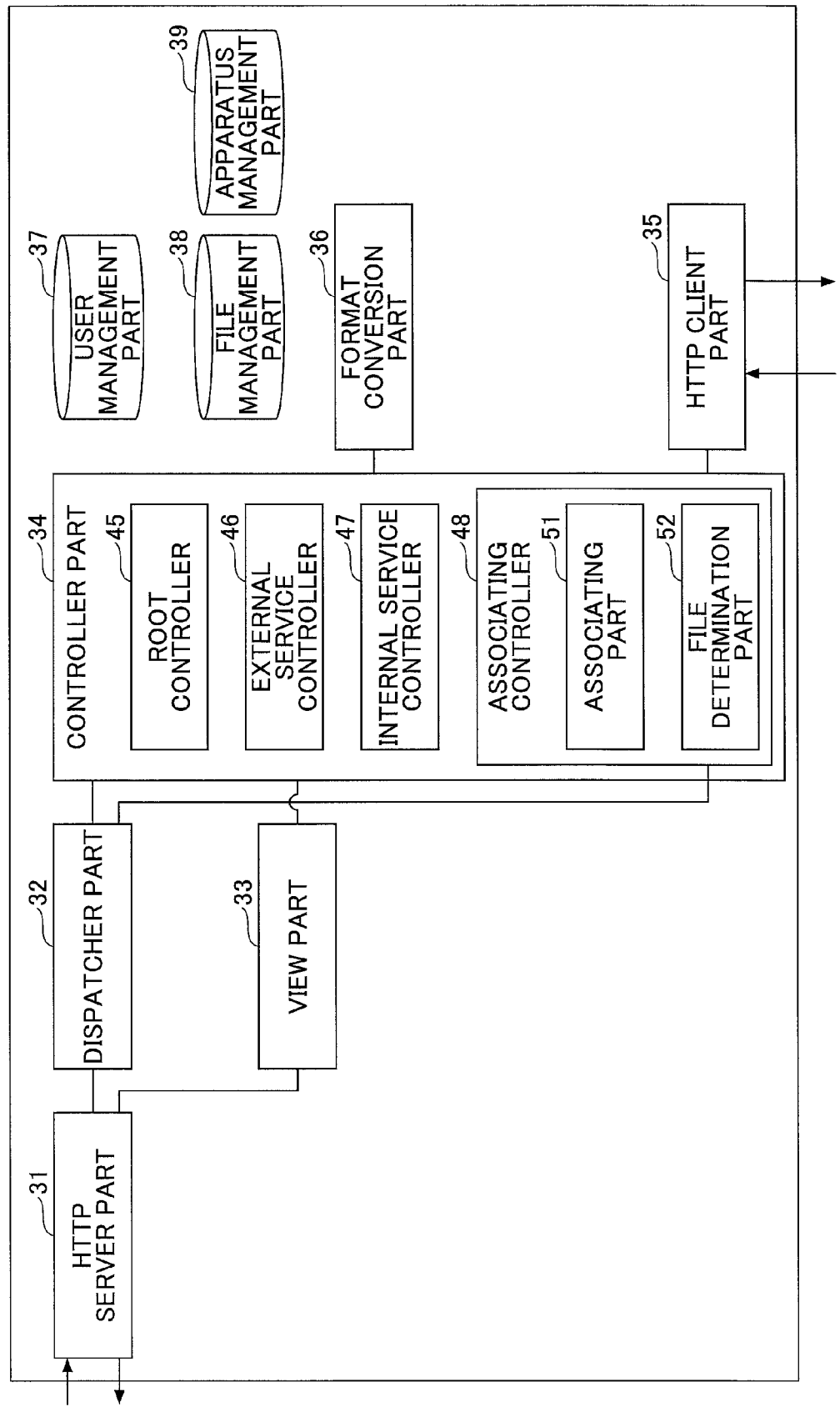
FIG. 26 is a software configuration diagram of the projection server in another example.

The apparatus information of FIG. 25 is managed by, for example, an apparatus management part 39 of the projection server 10 as shown in FIG. 26. FIG. 26 is a software configuration diagram of the projection server 10 in another example. The software configuration of FIG. 26 is such that, to the projection server 10 of FIG. 3, the apparatus management part 39 is added. The apparatus management part 39 manages apparatus information such as that shown in FIG. 25. Because the projection server 10 of FIG. 26 is the same as the software configuration of FIG. 3 except for the apparatus management part 39, further description will be omitted.

Figure 27:
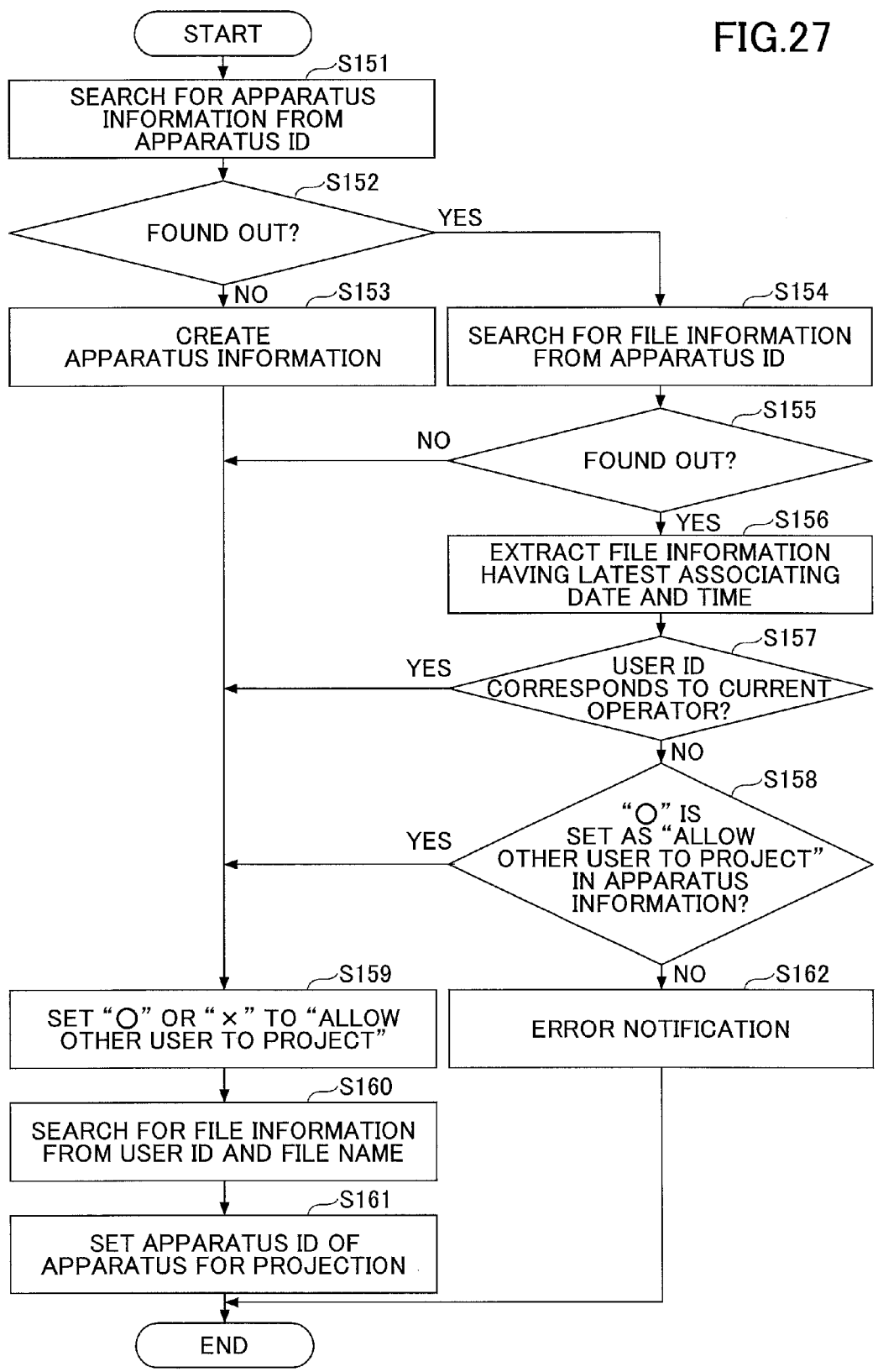
FIG. 27 is a flowchart of a process of associating in step S92 in another example.

FIG, 27 is a flowchart of a process of associating in step S92 of FIG. 13 in another example. Note that the same process can be applied also to associating in step S108 of FIG. 15. In FIG. 27, the projection server 10 searches for a set of apparatus information soon as that of FIG. 25 using the apparatus ID as a search key in step S151. In step S152, the projection server 10 determines whether any set of apparatus information is retrieved from the search of step S151.

When no apparatus information is retrieved from the search of step S151, the projection server 10 proceeds to step S153, creates a new set of apparatus information for the apparatus ID, and sets "O" or "X" in the item "allow other user to project" in step S159 according to the operator's instruction. The thus created set of apparatus information is managed by the apparatus management part 39.

Then, the projection server 10 proceeds with step S160, the projection server 10 searches for a set of file information such as that shown in FIG. 8 using the user ID and the file name as search keys. In step S161, the projection server 10 sets the apparatus ID for which the associating request is sent as the "apparatus ID of apparatus that projects image" of the thus retrieved set of file information.

On the other hand, when a set of apparatus information is retrieved from the search of step S151, the projection server 10 proceeds to seep S154 and searches for sets of file information such as that shown in FIG. 8 by using the apparatus ID as a search key. In step S155, the project for server 10 determines whether any set of file information is retrieved from the search of step S154. The process of step S155 is carried out for the purpose of determining whether the apparatus ID is already associated with another file.

When no file information is retrieved from the search of step S154, the projection server 10 executes the process starting from step S155 described above. When any set of file information is retrieved from the search of step S154, the projection server 10 determines that the apparatus ID is already associated with another file, and proceeds to step S156.

In step S156, the projection server 10 extracts the set of file information having the latest "associating date and time" from among those retrieved from the search of step S154. In step S157, the projection server 10 determines whether the user ID included in the set of file information extracted in step S156 is the same as the user who has currently logged in (operator himself or herself).

When the user ID included in the set of file information extracted in step S156 is the same as the user who has currently logged in (operator himself or herself), the projection server 10 executes the process starting from step S159 described above.

On the other hand, when the user ID included in the set or file information extracted in step S156 is not the same as the user who has currently logged in (operator himself or herself), the projection server 10 determines in step S158 whether the item "allow other user to project" in the set of apparatus information thus retrieved in step S151 is "O". The process of step S158 determines whether the operator who associates the projector 15 of the apparatus ID most recently allows another user to project, When the item "allow other user to project" in the set of apparatus information thus retrieved in step S151 is "O", the projection server 10 carries out the process starting from step S159 described above. In this case, in step S159, the projection server 10 overwrites a new setting in the item "allow other user to project" of the set of apparatus information of the apparatus with which a file is already associated. Note that, it is also possible that, when step S160 is executed through step S158, the projection server 10 deletes the apparatus ID that is set in the "apparatus ID of apparatus that projects image" of all the sets of file information retrieved in step S154.

In this case, all the sets of associating the apparatus ID with files are stopped. In the process of step S161, the projection server 10 sets the apparatus ID for which the associating request is sent in the "apparatus ID of apparatus that projects image" of the set of file information retrieved in step S160.

Therefore, in this case, all the associating the apparatus ID with a file(s) currently present is only one that is set by the operator who has currently logged in, in step S161. Thus, the operator who has currently logged in can stop associating the projector 15 to be used for projection with files first and then cause the projector 15 to have such a state of being able to project only the file(s) associated by the user who has currently logged in himself or herself.

Note that when the item "allow other user to project" of the retrieved set of apparatus information is not set as "O" in step S158, the projection server 10 proceeds to step S162 and sends an error notification to the smartphone 21. For example, when a plurality of users project materials (files) in a conference or so, a user who associates the projector 15 most recently can make such a setting of not allowing projection by other users in the projector designation screen page 171 of FIG. 24. Thereby, it is possible to avoid further associating.

For example, when such a setting is carried out of not allowing projection by the other users, another operator is not allowed to newly carry out associating until all the operators who have carried out associating until then stop the associating. Thus, the operator can set a lock of associating the projector 15 with a file.

The sequence diagram of FIG. 13 shows a process for a case where selecting a file and designating an apparatus ID are carried out by using separate screen pages. Note that, it is also possible that a file can be selected and an apparatus ID can be designated by using the same screen page as shown in FIGS. 28 and 29.

Figure 28:
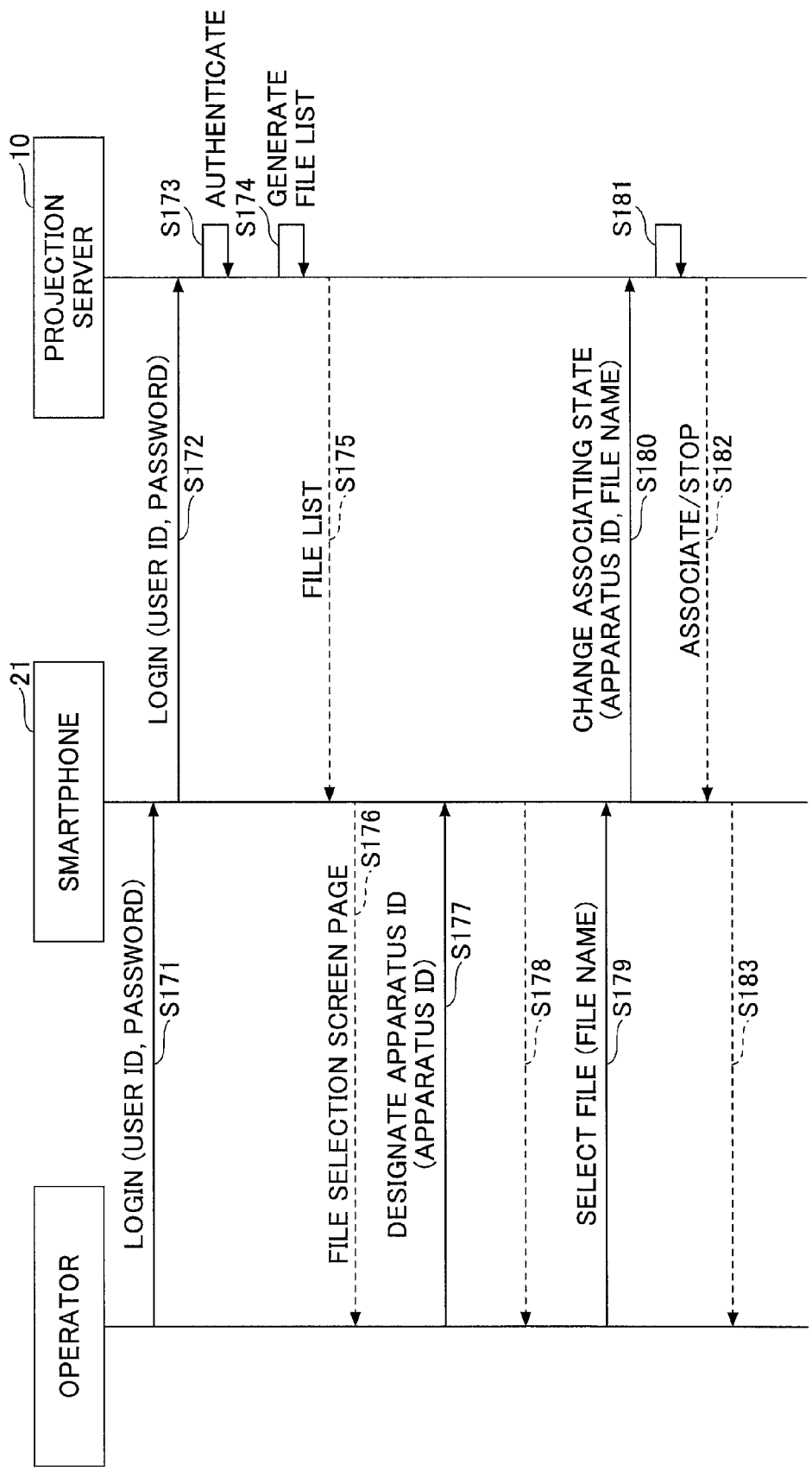
FIG. 28 is a sequence diagram of an associating process in another example.
Figure 29:
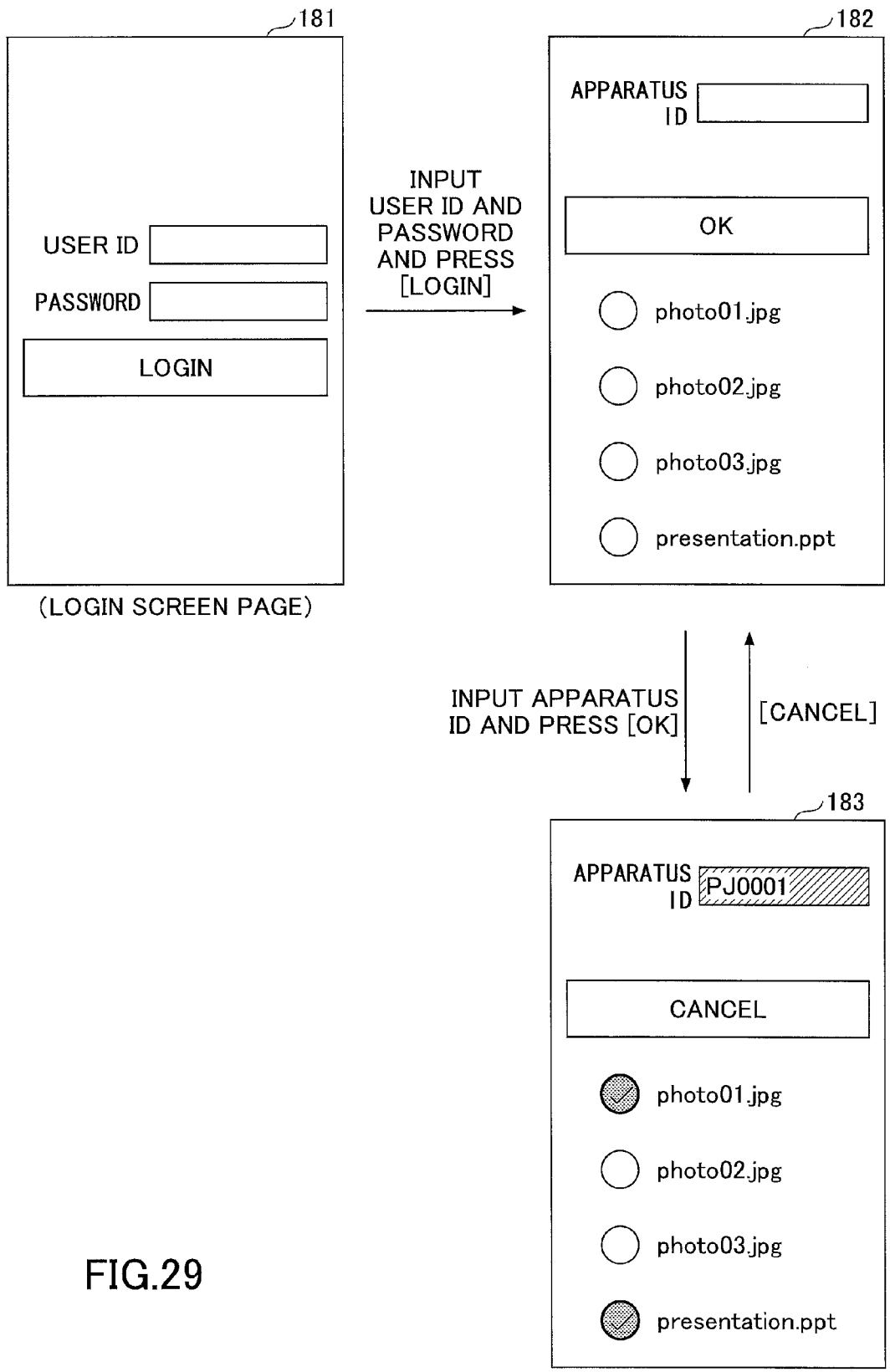
FIG. 29 is a screen page transition diagram at a time of an associating process in the example of FIG. 28.

FIG. 28 is a sequence diagram of an associating process in another example and FIG. 29 is a screen page transition diagram at a time of an associating process in the example of FIG. 28. Note that, the process of steps S171 to S175 in FIG. 28 is the same as the process of steps S81 to S85 in FIG. 13 and therefore, description thereof will be omitted.

In step S176 of FIG. 28, the smartphone 21 displays a file selection screen page 182 of FIG. 29. In the file selection screen page 182 of FIG. 29, a file list of image files and/or multi-page files uploaded by the operator who has currently logged in is displayed. In step S177, the operator designates the apparatus ID of the projector 15 to foe associated with the image files and/or multi-page files in the "apparatus ID" setting field of the file selection screen page 182 and presses the "OK" button. In step S178, the smartphone 21 displays a file selection screen page 183 of FIG. 29. The file selection screen page 183 is in a state where the apparatus ID is designated in the "apparatus ID" setting field of the file selection screen page 182 and further inputting an apparatus ID is not allowed.

In step S179, the operator selects an image file and/or a multi-page file to be associated (information of which is to be stored in a manner of being associated) with the projector 15 from the file selection screen page 183. The smartphone 21 transmits the designated apparatus ID and the file names of the selected image file and/or multi-page file to the projection server 10 and sends an "associating state change request" ("change associating state") thereto in step S180. In step S181, the projection server 10 carries out an associating/stop process as shown in FIG. 30, for example.

Figure 30:
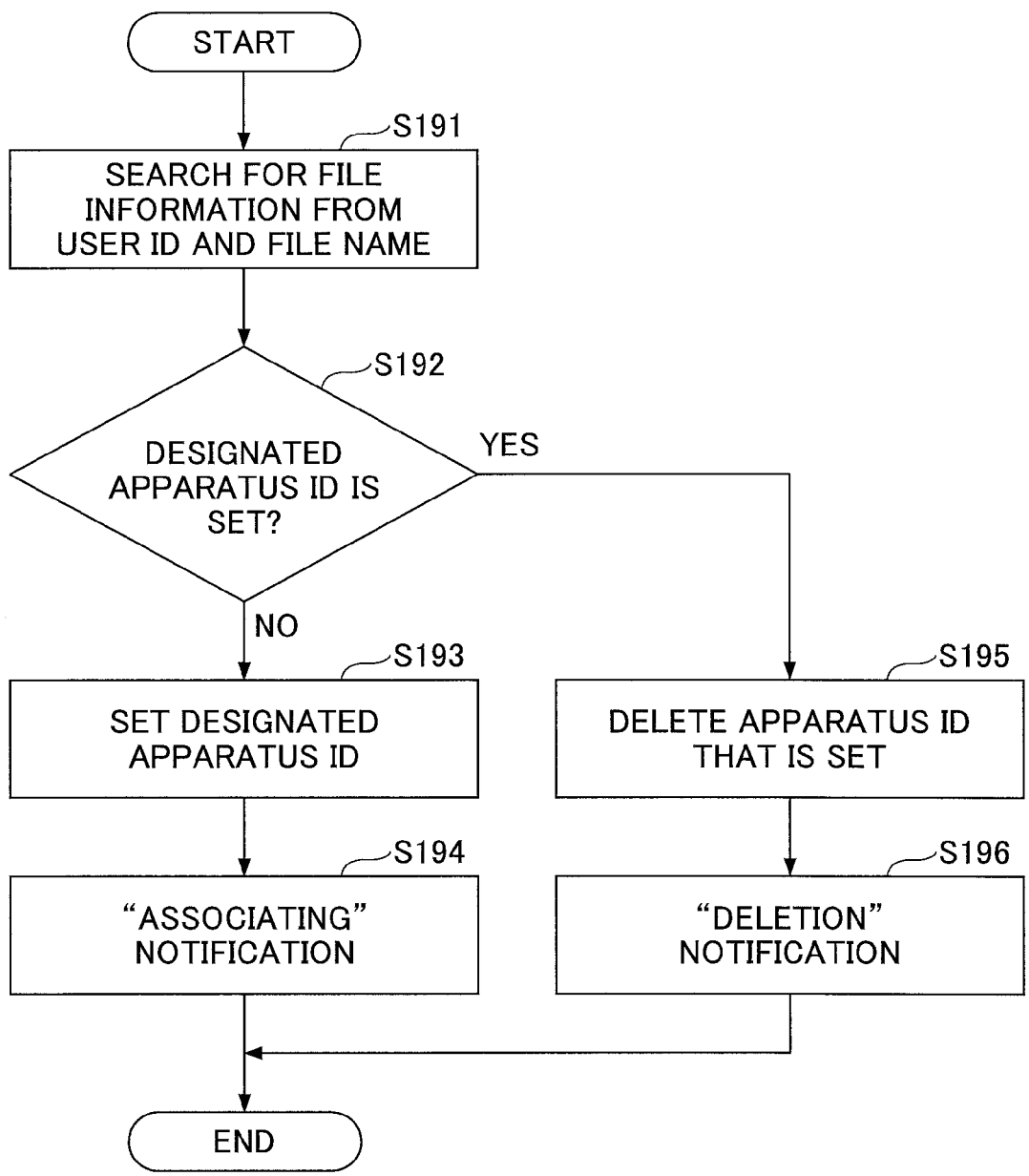
FIG. 30 is a flowchart of one example of an associating/stop process.

FIG. 30 is a flowchart of one example of an associating/stop process. In step S191, the projection server 10 searches for a set of file information such as that shown in FIG. 8 using the user ID of the operator who succeeds in the authentication and the file names for which the "associating state change request" is sent in step S180 as search keys. In step S192, the projection server 10 determines whether the apparatus ID designated in step S180 is set in the "apparatus ID of apparatus that projects image" of the thus retrieved sets of file information.

When the apparatus ID designated in step S180 is not set in the "apparatus ID of apparatus that projects image" of the thus retrieved sets of file information, the projection server 10 executes step S193. In step S193, the projection server 10 sets the apparatus ID designated, in step S180 in the "apparatus ID of apparatus that projects image" of the thus retrieved sets of file information. Then, the projection server 10 proceeds to step S194 and sends an "associating" notification.

On the other hand, when the apparatus ID designated in step S180 is set in the "apparatus ID of apparatus that projects image" of the thus retrieved sets of file information, the projection server 10 executes step S195. In step S195, the projection server 10 deletes the apparatus ID designated in step S180 from the "apparatus ID of apparatus that projects image" of the thus retrieved sets of file information. Then, the projection server 10 proceeds to step S194 and sends a "deletion" notification.

Returning to step S182 of FIG. 28, the projection server 10 sends the "associate" ("associating") notification or the "stop" ("deletion") notification to the smartphone 21. Thus, the operator can select a file(s) and designate an apparatus ID from by using the same screen page. Further, the operator can associate another file with the same apparatus ID without stopping associating the previous file with the same apparatus ID.

The sequence diagram of FIG. 13 shows a process for a case where the operator explicitly stops associating. However, it is also possible that associating is automatically stopped for a file for which a predetermined time has elapsed from the "associating date and time" of file information, FIG. 31 is a flowchart of one example of a stop process.

Figure 31:
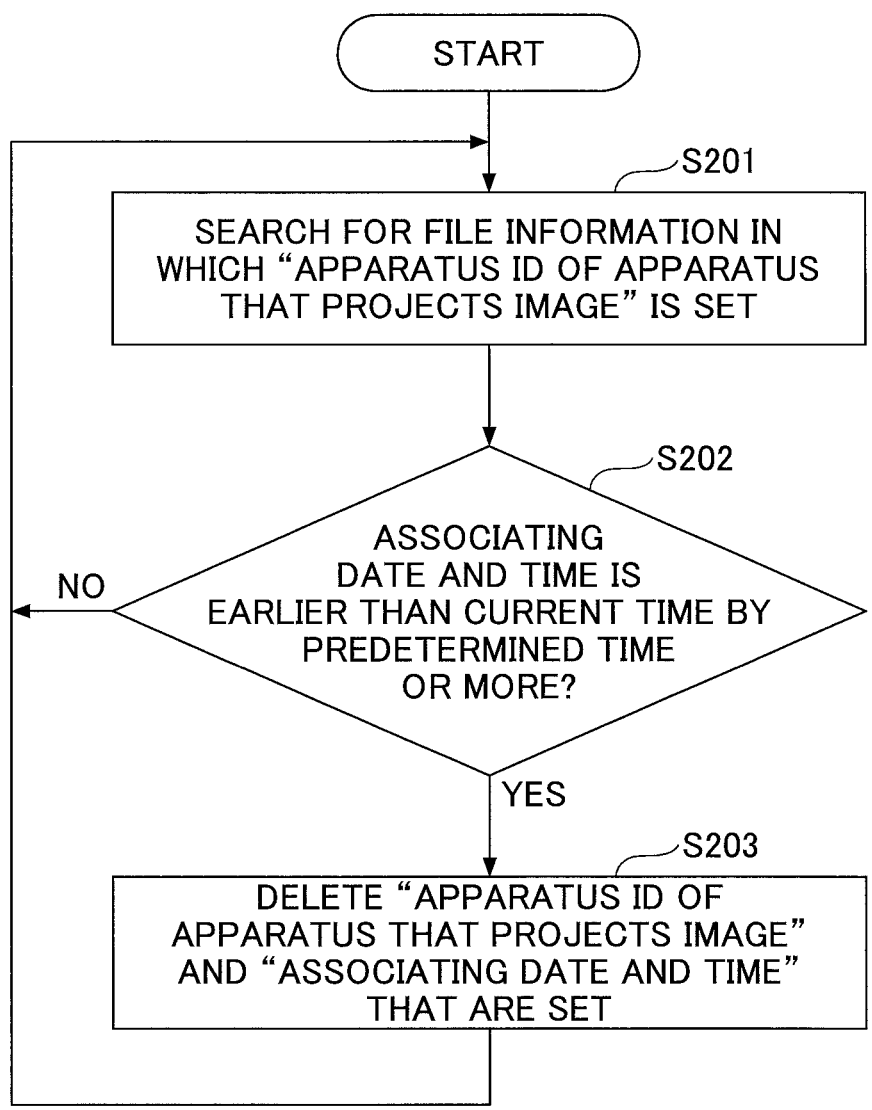
FIG. 31 is a flowchart of one example of a stop process.

In step S201 of FIG. 31, the projection server 10 searches for a set of file information in which the "apparatus ID of apparatus that projects image" is set. In step S202, the projection server 10 determines whether the "associating date and time" in the thus retrieved set of file information indicates a time earlier than the current time by the predetermined time or more.

When the "associating date and time" in the thus retrieved set of file information indicates a time that is not earlier than the current time by the predetermined time or more, the projection server 10 returns to step S201. When the "associating date and time" in the thus retrieved set of file information indicates a time earlier than the current time by the predetermined time or more, the projection server 10 proceeds to step S203 and deletes the "apparatus ID of apparatus that projects image" and the "associating date and time" that are set in the set of file information. Thus, even when the operator does not explicitly stop associating, associating can be automatically stopped.

Designation of the projector 15 into the projector designation screen page 74 of FIG. 14 and the projector designation screen page 82 of FIG. 16 is carried out by inputting the apparatus ID. However, it is also possible that, for example, a corresponding QR code (registered trademark) is used for the projection server 10 and the projector 15 can be designated without directly inputting the apparatus ID.

Figure 32:
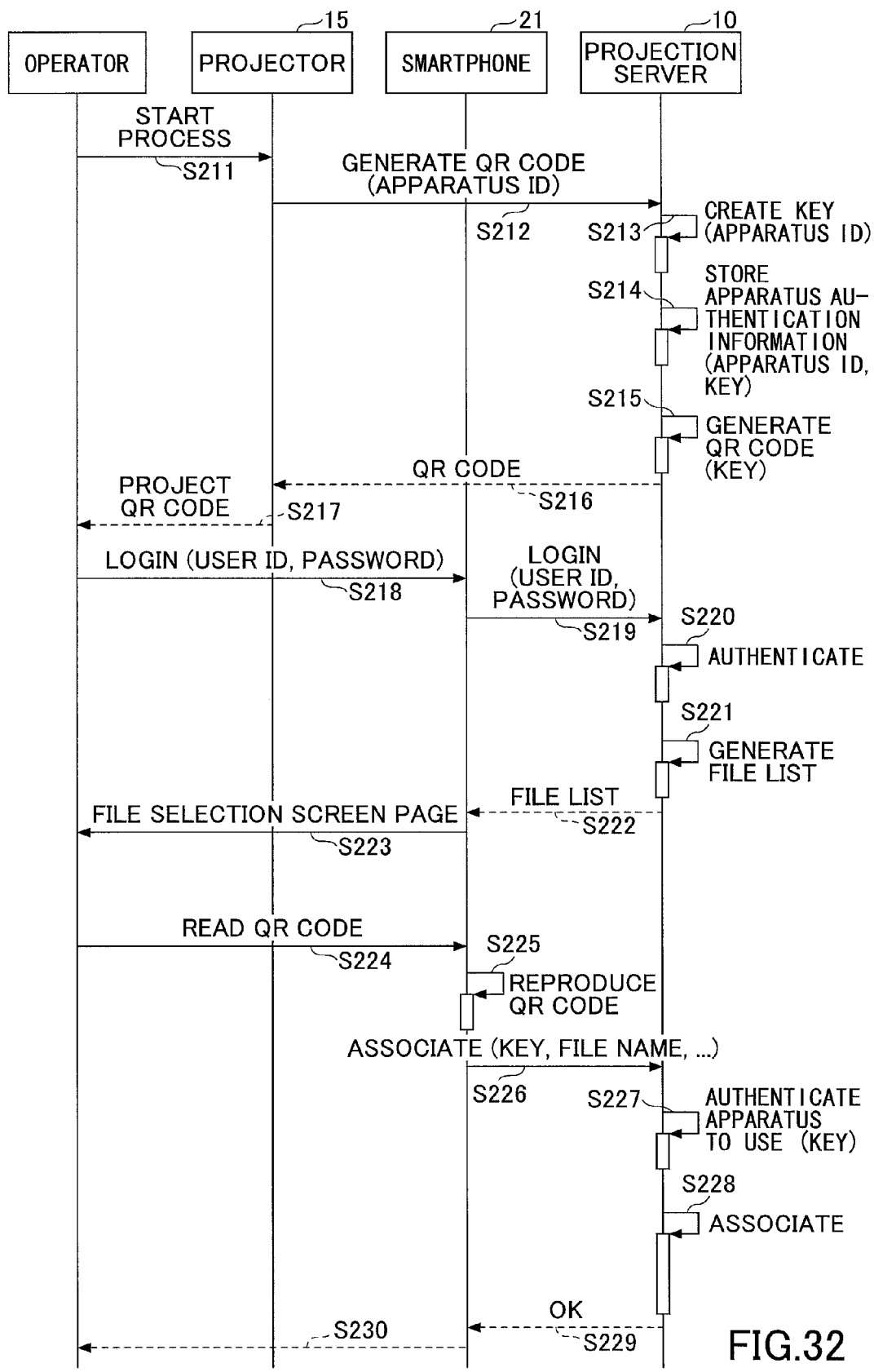
FIG. 32 is a sequence diagram of an associating process in another example.

FIG. 32 is a sequence diagram of an associating process in another example. In step S211 of FIG. 32, the operator requests the projector 15 to start a process of transmitting a file selected by the operator to the projector 15 from the projection server 10 and projecting the file by the projector 15.

Figures 33, 34:
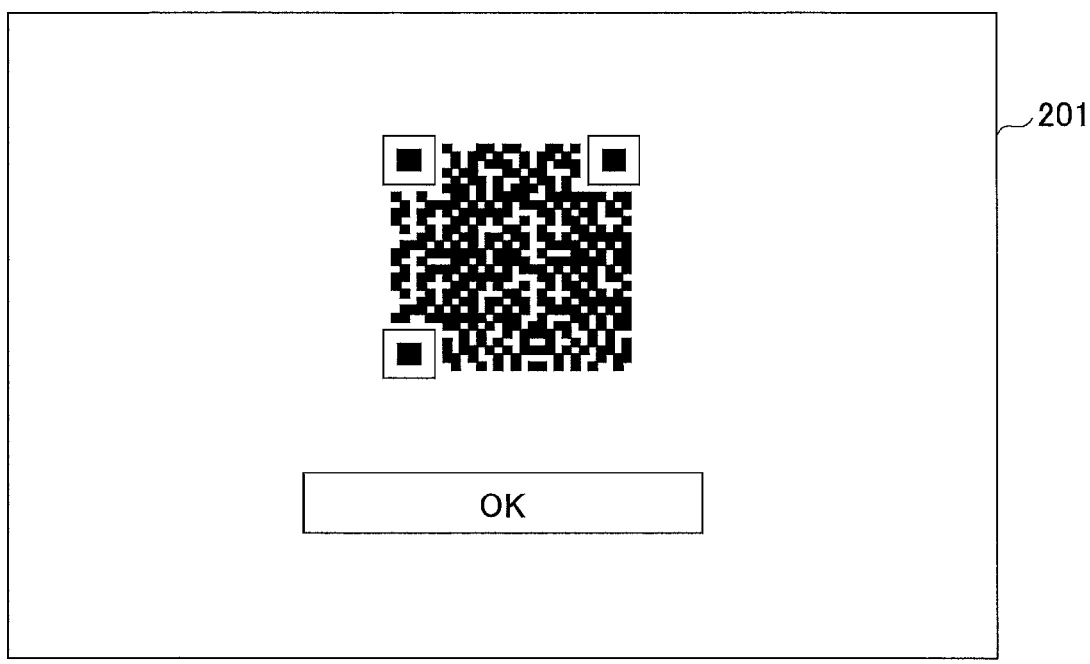
FIG. 33 is an image diagram of one example of a QR code projection screen page.
FIG. 34 is a configuration diagram of one example of apparatus authentication information.

In step S212 of FIG. 32, the projector 15 transmits the apparatus ID to the projection server 10 and requests the projection server 10 to generate a QR code. In step S213, the projection server 10 creates a key from the apparatus ID. The projection server 10 stores "apparatus authentication information" in which the apparatus ID is associated with the key (i.e., information of the apparatus ID and the key is stored in such a manner that they are associated with one another) as shown in FIG. 34, for example, in step S214. FIG. 34 is a configuration diagram of one example of "apparatus authentication information".

In step S215 of FIG. 32, the projection server 10 generates a QR code from the key created in step S213. In step S216, the projection server 10 transmits the QR code to the projector 15. The projector 15 projects a QR code projection screen page 201 including the QR code as shown in FIG. 33, for example, in step S217. FIG. 33 is an image diagram of one example of a QR code projection screen page.

The process of steps S218 to S223 is the same as the process of steps S81 to S86 of FIG. 13, and the description will be omitted. Further, although not shown, in the sequence diagram of FIG. 32, a file is selected in the same way as steps S87 to S88 of FIG. 13 before step S224.

Further, in step S224, the operator operates the smartphone 21 and reads the QR code by the smartphone 21 from, for example, the QR code projection screen page 201 of FIG. 33 projected by the projector 15.

In step S225, the smartphone 21 reproduces the key from the thus read QR code. In step S226, the smartphone 21 transmits the reproduced key as well as the file names of the selected image file and/or multi-page file to the projection server 10 and sends an associating request thereto. In step S227, the projection server 10 authenticates the apparatus to be used (acquires the apparatus ID of the apparatus to be used) by using the key included in the associating request and the apparatus authentication information of FIG. 34. After thus acquiring the apparatus ID corresponding to the key, the projection server 10 carries out the process of steps S228 to S230 which is the same as the process of steps S92 to S94 of FIG. 13, and therefore, the description will be omitted. Thus, the operator can designate the projector 15 to be used to project a file without inputting the apparatus ID.

<Summary of the Embodiment>

Thus, according to the projection server 10 of the present embodiment, for projecting a file by the projector 15, it is possible to previously project a list of files uploaded by the operator who has currently logged in without inputting an access number (passcode) or such into the projector 15.

By storing information of the projector 15 to be used for projecting files and the files to be projected by the projector 15 in a manner of associating them with each other immediately before projecting the files, the operator can select one from among a list of the files thus associated with the projector 15 which is to be currently projected. Thus, it is possible to improve the convenience of the projector 15.

Note that an "information processing system" corresponds to the projection system. An "image display apparatus" corresponds to the projector 15. An "information processing apparatus" corresponds to the projection server 10. An "operation terminal" corresponds to the smartphone 21.

Thus, the information processing apparatus and the information processing system have been described in the embodiment. However, the present invention is not limited to the specifically disclosed embodiment and variations and modifications may be made without departing from the scope of the present invention.

The present application is based on and claims the benefit of priority of Japanese Priority Application No. 2013-162295 dated Aug. 5, 2013, the entire content of which are hereby incorporated herein by reference.

What is claimed is:

1. An information processing apparatus comprising:
a network interface configured to connect a projection system with a plurality of projectors each displaying an image;
one or more memories configured to store one or more sets of image data in a manner of associating the one or more sets of image data with respective sets of user identification information identifying respective users; and
one or more sets of circuitry configured to
in response to receiving from an operation terminal a set of the user identification information identifying a user and a set of the apparatus identification information identifying one of the projectors, store information of a set of image data that is associated with the received set of user information from among the one or more sets of image data stored in the one or more memories in a manner of associating the set of image data with the received set of apparatus identification information, and
in response to receiving a request from the one of the projectors identified by the set of apparatus identification information, transmit the set of image data associated with the set of apparatus identification information from among the one or more sets of image data stored in the one or more memories to the one of the projectors,
wherein the one or more sets of circuitry are configured to have a function of setting a lock of associating the set of image data with the set of apparatus identification information.

2. The information processing apparatus as claimed in claim 1, wherein
the one or more sets of circuitry are configured to store the received set of apparatus identification information in a manner of associating the received set of apparatus identification information with the set of image data that is associated with the received set of user identification information and has a latest registration time from among the one or more sets of image data stored in the one or more memories.

3. The information processing apparatus as claimed in claim 1, wherein
the one or more sets of circuitry are configured to receive, as the set of apparatus identification information identifying the one of the projectors, a set of apparatus identification information identifying one of the projectors previously used by the user.

4. The information processing apparatus as claimed in claim 1, wherein
when the received set of apparatus identification information is already stored in a manner of being associated with one or more sets of image data stored in the one or more memories, the one or more sets of circuitry are configured not to store the received set of apparatus identification information in the manner of associating the received set of apparatus identification information with the set of image data that is associated with the received set of user information.

5. The information processing apparatus as claimed in claim 1, wherein
the one or more sets of circuitry are configured to stop associating the set of image data with the set of apparatus identification information after the elapse of a predetermined time.

6. An information processing system comprising:
one or more projection systems, wherein
the one or more the projection systems include
a network interface configured to connect the projection systems with a plurality of projectors each displaying an image;
one or more memories configured to store one or more sets of image data in a manner of associating the one or more sets of image data with respective sets of user identification information identifying respective users; and
one or more sets of circuitry configured to
in response to receiving from an operation terminal a set of the user identification information identifying a user and a set of apparatus identification information identifying one of the projectors, store a set of image data that is associated with the received set of user information from among the one or more sets of image data stored in the one or more memories in a manner of associating the set of image data with the received set of apparatus identification information, and
in response to receiving a request from the one of the projectors identified by the set of apparatus identification information, transmit the set of image data associated with the set of apparatus identification information from among the one or more sets of image data stored in the one or more memories to the one of the projectors,
wherein the one or more sets of circuitry are configured to have a function of setting a lock of associating the set of image data with the set of apparatus identification information.

7. An information processing apparatus comprising:
a network interface configured to connect a projection system with a plurality of projectors each displaying an image;
one or more memories configured to store one or more sets of image data in a manner of associating the one or more sets of image data with respective sets of user identification information identifying respective users; and
one or more sets of circuitry configured to
in response to receiving from an operation terminal a set of the user identification information identifying a user, transmit respective sets of image data identification information identifying sets of image data associated with the received set of user information from among the one or more sets of image data stored in the one or more memories,
in response to receiving, from the operation terminal, a set of the image data selected based on the respective sets of image data identification information and a set of apparatus identification information identifying one of the projectors, store information of the set of image data concerning the selected set of image data from among the one or more sets of image data stored in the one or more memories in a manner of associating the set of image data with the received set of apparatus identification information, and
in response to receiving a request from the one of the projectors identified by the set of apparatus identification information, transmit the set of image data associated with the set of apparatus identification information from among the one or more sets of image data stored in the one or more memories to the one of the projectors, wherein the one or more sets of circuitry are configured to have a function of setting a lock of associating the set of image data with the set of apparatus identification information.

8. The information processing apparatus as claimed in claim 7, wherein the respective sets of image identification information include respective names and thumbnails of the sets of image data associated with the received set of user information, the thumbnails of the sets of image data being generated from the sets of image data, respectively.

9. The information processing apparatus as claimed in claim 7, wherein the one or more sets of circuitry are configured to receive, as the set of apparatus identification information identifying the one of the projectors, a set of apparatus identification information identifying one of the projectors previously used by the user.

10. The information processing apparatus as claimed in claim 7, wherein when the received set of apparatus identification information is already stored in a manner of being associated with one or more sets of image data stored in the one or more memories, the one or more sets of circuitry are configured not to store the received set of apparatus identification information in the manner of associating the received set of apparatus identification information with the selected set of image data.

11. The information processing apparatus as claimed in claim 7, wherein the one or more sets of circuitry are configured to stop associating the set of image data with the set of apparatus identification information after the elapse of a predetermined time.

* * * * *